United States Patent
Biskeborn et al.

(10) Patent No.: US 10,984,823 B2
(45) Date of Patent: Apr. 20, 2021

(54) WRITE TRANSDUCERS HAVING HIGH MOMENT LAYER

(71) Applicant: International Business Machines Corporation, Armonk, NY (US)

(72) Inventors: Robert G. Biskeborn, Hollister, CA (US); Robert E. Fontana, Jr., San Jose, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/274,805

(22) Filed: Feb. 13, 2019

(65) Prior Publication Data

US 2019/0180774 A1     Jun. 13, 2019

Related U.S. Application Data

(63) Continuation of application No. 15/444,160, filed on Feb. 27, 2017, now Pat. No. 10,283,147.

(51) Int. Cl.

| | |
|---|---|
| *G11B 5/31* | (2006.01) |
| *G11B 5/29* | (2006.01) |
| *G11B 5/265* | (2006.01) |
| *G11B 5/23* | (2006.01) |
| *G11B 5/147* | (2006.01) |
| *G11B 5/187* | (2006.01) |
| *G11B 5/008* | (2006.01) |
| *G11B 5/39* | (2006.01) |

(52) U.S. Cl.
CPC ........ *G11B 5/3153* (2013.01); *G11B 5/00813* (2013.01); *G11B 5/147* (2013.01); *G11B 5/1871* (2013.01); *G11B 5/23* (2013.01); *G11B 5/265* (2013.01); *G11B 5/29* (2013.01); *G11B 5/3116* (2013.01); *G11B 5/3143* (2013.01); *G11B 5/3945* (2013.01); *G11B 5/3967* (2013.01)

(58) Field of Classification Search
None
See application file for complete search history.

(56) References Cited

U.S. PATENT DOCUMENTS

| | | |
|---|---|---|
| 5,828,533 A | 10/1998 | Ohashi et al. |
| 5,831,801 A | 11/1998 | Shouji et al. |
| 6,108,167 A | 8/2000 | Tateyama et al. |

(Continued)

OTHER PUBLICATIONS

Biskeborn et al., U.S. Appl. No. 16/274,829, filed Feb. 13, 2019.

(Continued)

*Primary Examiner* — Craig A. Renner
(74) *Attorney, Agent, or Firm* — Zilka-Kotab, P.C.

(57) ABSTRACT

An apparatus, according to one embodiment, includes: an array of write transducers. Each of the write transducers include: a first write pole having a pole tip extending from a media facing side of the first write pole, and a second write pole having a pole tip extending from a media facing side of the second write pole. Each of the write transducers also include a nonmagnetic write gap between the pole tips of the write poles, and a first high moment layer between the write gap and the pole tip of the second write pole. The first high moment layer further includes a higher magnetic moment than a magnetic moment of the pole tip of the second write pole. Other systems, methods, and computer program products are described in additional embodiments.

14 Claims, 16 Drawing Sheets

(56) References Cited

U.S. PATENT DOCUMENTS

| | | |
|---|---|---|
| 6,132,892 A | 10/2000 | Yoshikawa et al. |
| 6,151,193 A | 11/2000 | Terunuma et al. |
| 6,296,955 B1 | 10/2001 | Hossain et al. |
| 6,317,290 B1 | 11/2001 | Wang et al. |
| 6,417,990 B1 | 7/2002 | Zhou et al. |
| 6,721,138 B1 | 4/2004 | Chen et al. |
| 6,724,572 B1 | 4/2004 | Stoev et al. |
| 6,778,357 B2 | 8/2004 | Tabakovic et al. |
| 7,023,658 B1 | 4/2006 | Knapp et al. |
| 7,248,433 B1 | 7/2007 | Stoev et al. |
| 7,310,204 B1 | 12/2007 | Stoev et al. |
| 7,522,377 B1 | 4/2009 | Jiang et al. |
| 7,576,952 B2 | 8/2009 | Maruyama et al. |
| 7,688,545 B1 | 3/2010 | Vas'Ko et al. |
| 8,355,222 B2 | 1/2013 | Mino et al. |
| 8,400,738 B2 | 3/2013 | Covington et al. |
| 8,724,259 B1 | 5/2014 | Liu et al. |
| 8,861,316 B2 | 10/2014 | Yin et al. |
| 10,121,498 B2 | 11/2018 | Biskeborn et al. |
| 10,283,147 B2 | 5/2019 | Biskeborn et al. |
| 10,529,363 B2 | 1/2020 | Biskeborn et al. |
| 10,650,848 B2 | 5/2020 | Biskeborn et al. |
| 2003/0202278 A1 | 10/2003 | Chen et al. |
| 2004/0027716 A1 | 2/2004 | Chen et al. |
| 2004/0246621 A1 | 12/2004 | Maruyama et al. |
| 2008/0278852 A1 | 11/2008 | Kim et al. |
| 2014/0063645 A1 | 3/2014 | Biskeborn et al. |
| 2018/0247663 A1 | 8/2018 | Biskeborn et al. |
| 2018/0247668 A1 | 8/2018 | Biskeborn et al. |
| 2018/0366147 A1 | 12/2018 | Biskeborn et al. |
| 2019/0180775 A1 | 6/2019 | Biskeborn et al. |

OTHER PUBLICATIONS

Biskeborn et al., U.S. Appl. No. 15/444,160, filed Feb. 27, 2017.
Biskeborn et al., U.S. Appl. No. 15/444,169, filed Feb. 27, 2017.
Non-Final Office Action from U.S. Appl. No. 15/444,169, dated Oct. 4, 2017.
Restriction Requirement from U.S. Appl. No. 15/444,160, dated Oct. 19, 2017.
Final Office Action from U.S. Appl. No. 15/444,169, dated Feb. 8, 2018.
Non-Final Office Action from U.S. Appl. No. 15/444,160, dated Mar. 15, 2018.
Notice of Allowance from U.S. Appl. No. 15/444,169, dated Jun. 28, 2018.
Biskeborn et al., U.S. Appl. No. 16/111,094, filed Aug. 23, 2018.
Final Office Action from U.S. Appl. No. 15/444,160, dated Sep. 19, 2018.
Notice of Allowance from U.S. Appl. No. 15/444,160, dated Dec. 19, 2018.
Supplemental Notice of Allowance from U.S. Appl. No. 15/444,160, dated Jan. 9, 2019.
Non-Final Office Action from U.S. Appl. No. 16/111,094, dated Jan. 11, 2019.
Supplemental Notice of Allowance from U.S. Appl. No. 15/444,160, dated Jan. 24, 2019.
Non-Final Office Action from U.S. Appl. No. 16/274,829, dated Jun. 27, 2019.
Final Office Action from U.S. Appl. No. 16/111,094, dated Jul. 1, 2019.
Notice of Allowance from U.S. Appl. No. 16/111,094, dated Sep. 3, 2019.
Notice of Allowance from U.S. Appl. No. 16/274,829, dated Jan. 7, 2020.
Supplemental Notice of Allowance from U.S. Appl. No. 16/274,829, dated Feb. 26, 2020.
Supplemental Notice of Allowance from U.S. Appl. No. 16/274,829, dated Apr. 2, 2020.

WRITE TRANSDUCERS HAVING HIGH MOMENT LAYER

BACKGROUND

The present invention relates to data storage systems, and more particularly, this invention relates to improved write transducer configurations.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus, according to one embodiment, includes: an array of write transducers. Each of the write transducers include: a first write pole having a pole tip extending from a media facing side of the first write pole, and a second write pole having a pole tip extending from a media facing side of the second write pole. Each of the write transducers also include a nonmagnetic write gap between the pole tips of the write poles, and a first high moment layer between the write gap and the pole tip of the second write pole. The first high moment layer further includes a higher magnetic moment than a magnetic moment of the pole tip of the second write pole.

An apparatus, according to another embodiment, includes: an array of write transducers. Each of the write transducers include: a first write pole having a pole tip extending from a media facing side of the first write pole, and a second write pole having a pole tip extending from a media facing side of the second write pole. Each of the write transducers also include a nonmagnetic write gap between the pole tips of the write poles, and a first high moment layer between the write gap and the pole tip of the second write pole. A second high moment layer is also positioned between the write gap and the pole tip of the first write pole. The first high moment layer includes a higher magnetic moment than a magnetic moment of the pole tip of the second write pole. Moreover, the second high moment layer includes a higher magnetic moment than a magnetic moment of the pole tip of the first write pole.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1A:
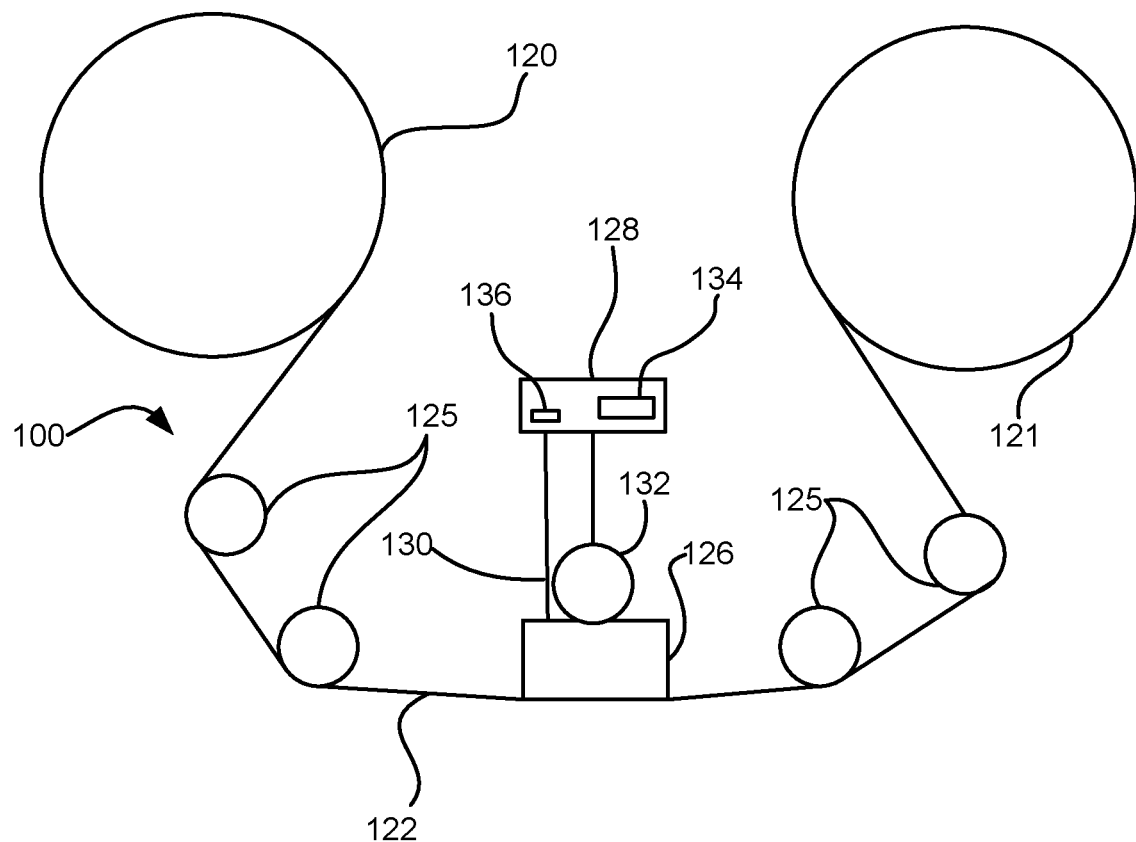
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems having improved performance when writing to high coercivity media, as well as operation and/or component parts thereof. Thin film layers of high moment materials may be implemented as described in the different embodiments below in order to achieve the surprising results discovered by the inventors. Thus, various embodiments included herein may be able to achieve improved writing to high coercivity tape media while maintaining sharper transitions on the tape media than conventionally achievable, e.g., as will be described in further detail below.

In one general embodiment, an apparatus includes: an array of write transducers, each write transducer having: a first write pole having a pole tip extending from a media facing side of the first write pole, a second write pole having a pole tip extending from a media facing side of the second write pole, a nonmagnetic write gap between the pole tips of the write poles, and a high moment layer between the write gap and the pole tip of the second write pole, the high moment layer having a higher magnetic moment than a magnetic moment of the pole tip of the second write pole.

In another general embodiment, an apparatus includes: an array of write transducers, each write transducer having: a first write pole having a pole tip extending from a media facing side of the first write pole, a second write pole having a pole tip extending from a media facing side of the second write pole, a nonmagnetic write gap between the pole tips of the write poles, a high moment layer between the write gap and the pole tip of the second write pole, the high moment layer having a higher magnetic moment than a magnetic moment of the pole tip of the second write pole, and a second high moment layer between the write gap and the pole tip of the first write pole, the second high moment layer having a higher magnetic moment than a magnetic moment of the pole tip of the first write pole.

In yet another general embodiment, an apparatus includes: an array of write transducers, each write transducer having: a first write pole having a pole tip extending from a media facing side of the first write pole, a second write pole having a pole tip extending from a media facing side of the second write pole, a nonmagnetic write gap between the pole tips of the write poles, and a high moment layer between the write gap and the pole tip of the first write pole, the high moment layer having a higher magnetic moment than a magnetic moment of the pole tip of the first write pole.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
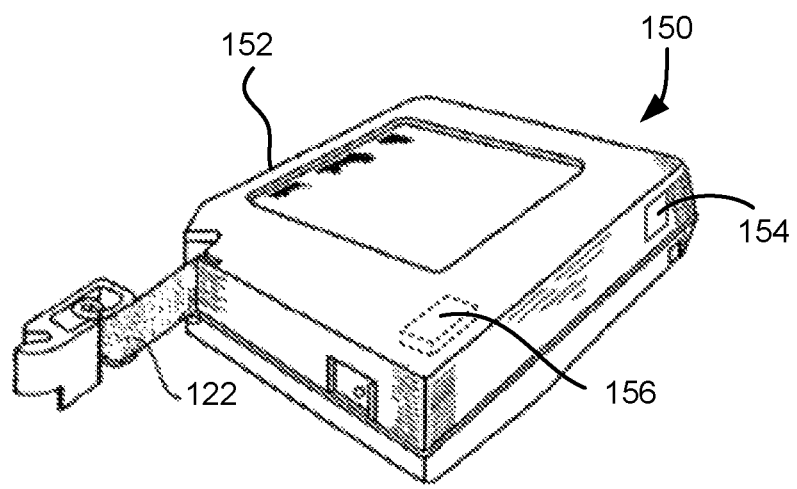
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read only memory (ROM) device, etc., embedded into or coupled to the inside or outside of the tape cartridge 150. The nonvolatile memory is accessible by the tape drive and the tape operating software (the driver software), and/or another device.

Figure 2A:
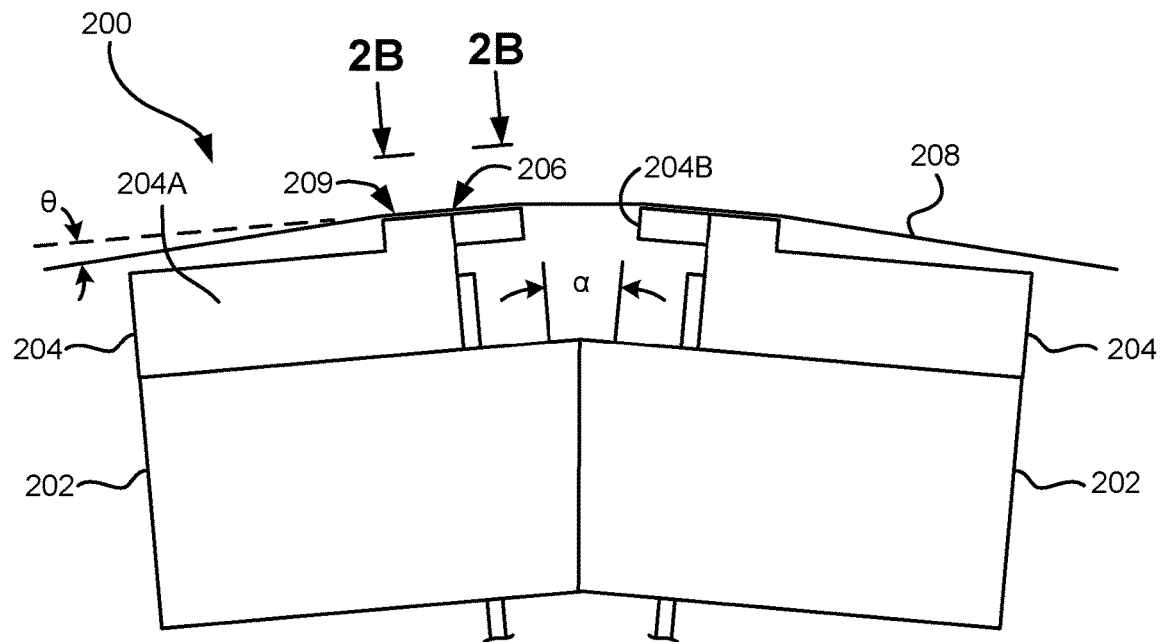
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
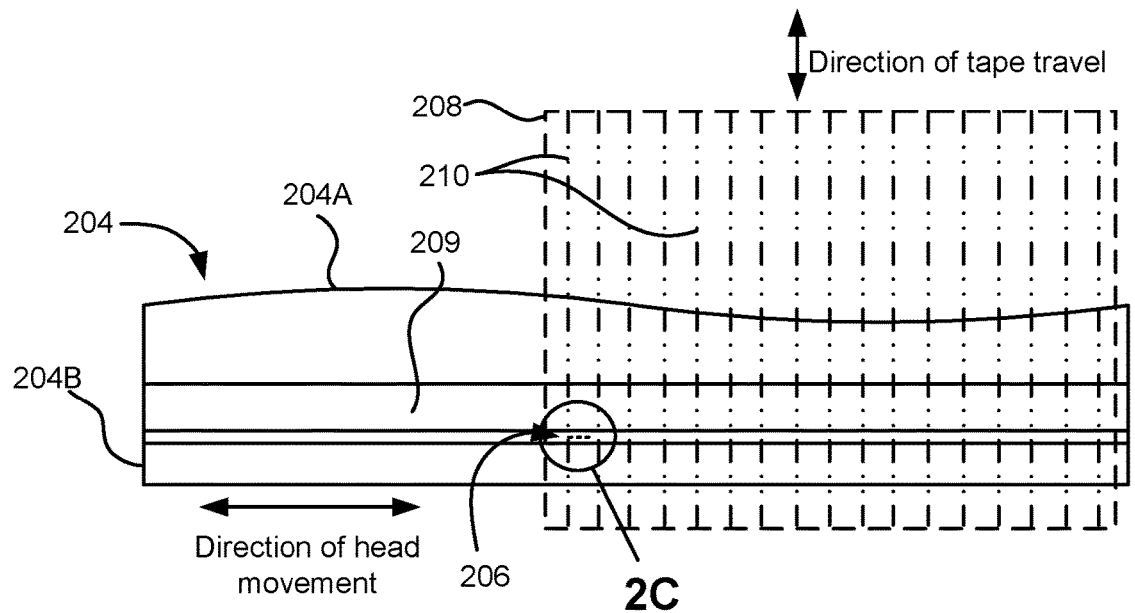
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
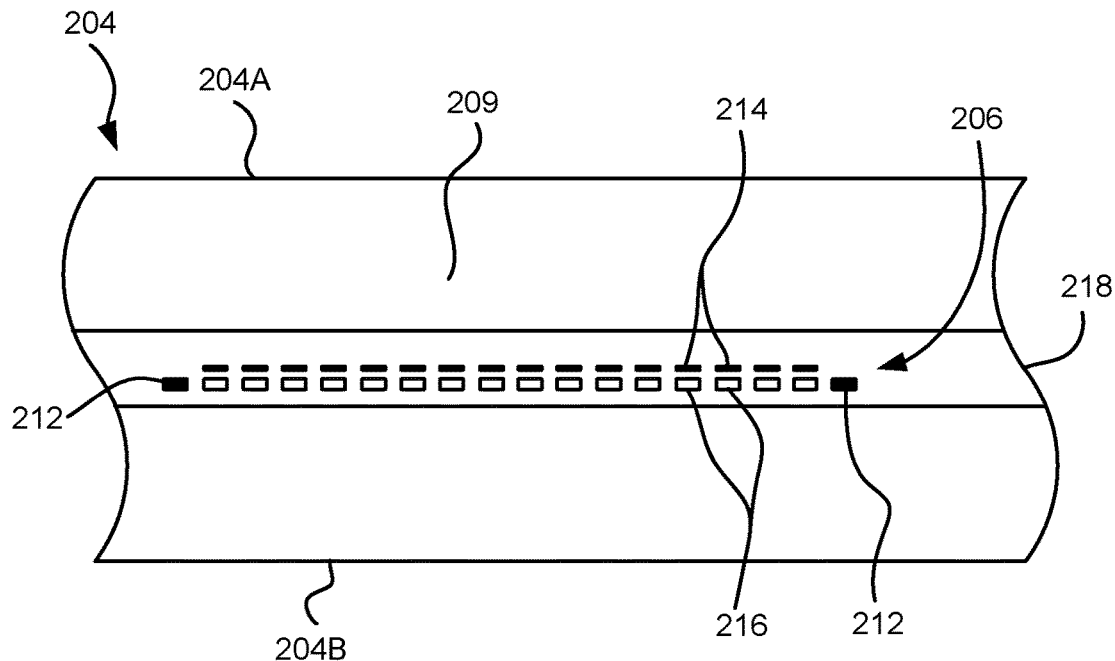
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary.

Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
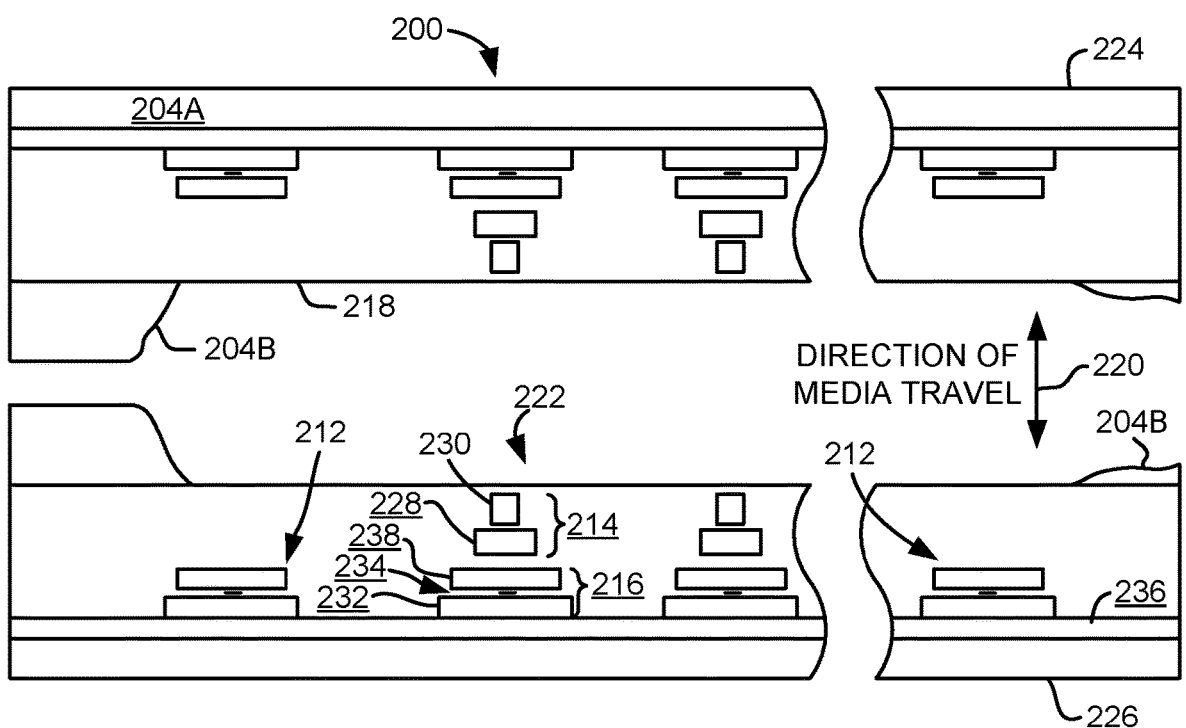
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistance (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
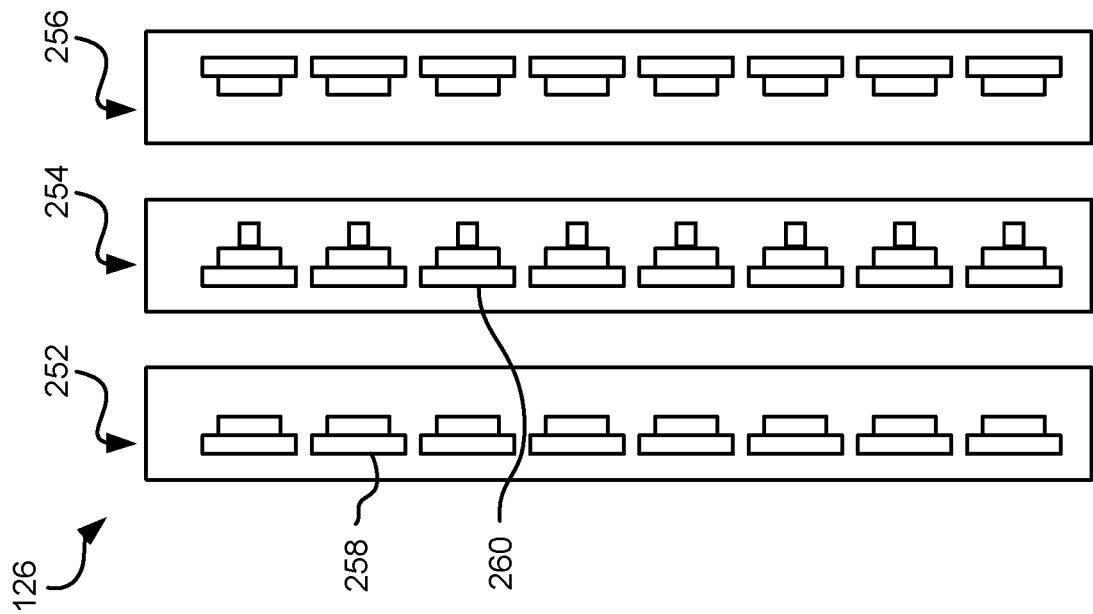
FIG. 4 is a partial tape bearing surface view of a magnetic head having a read-write-read configuration.
Figure 3:
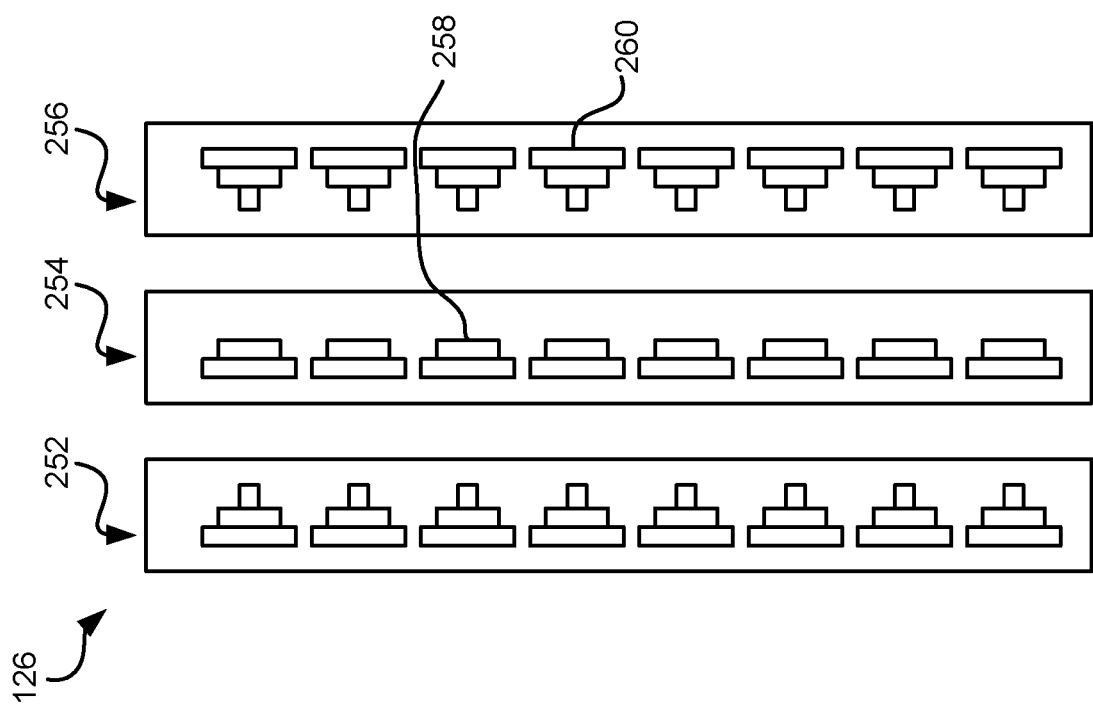
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
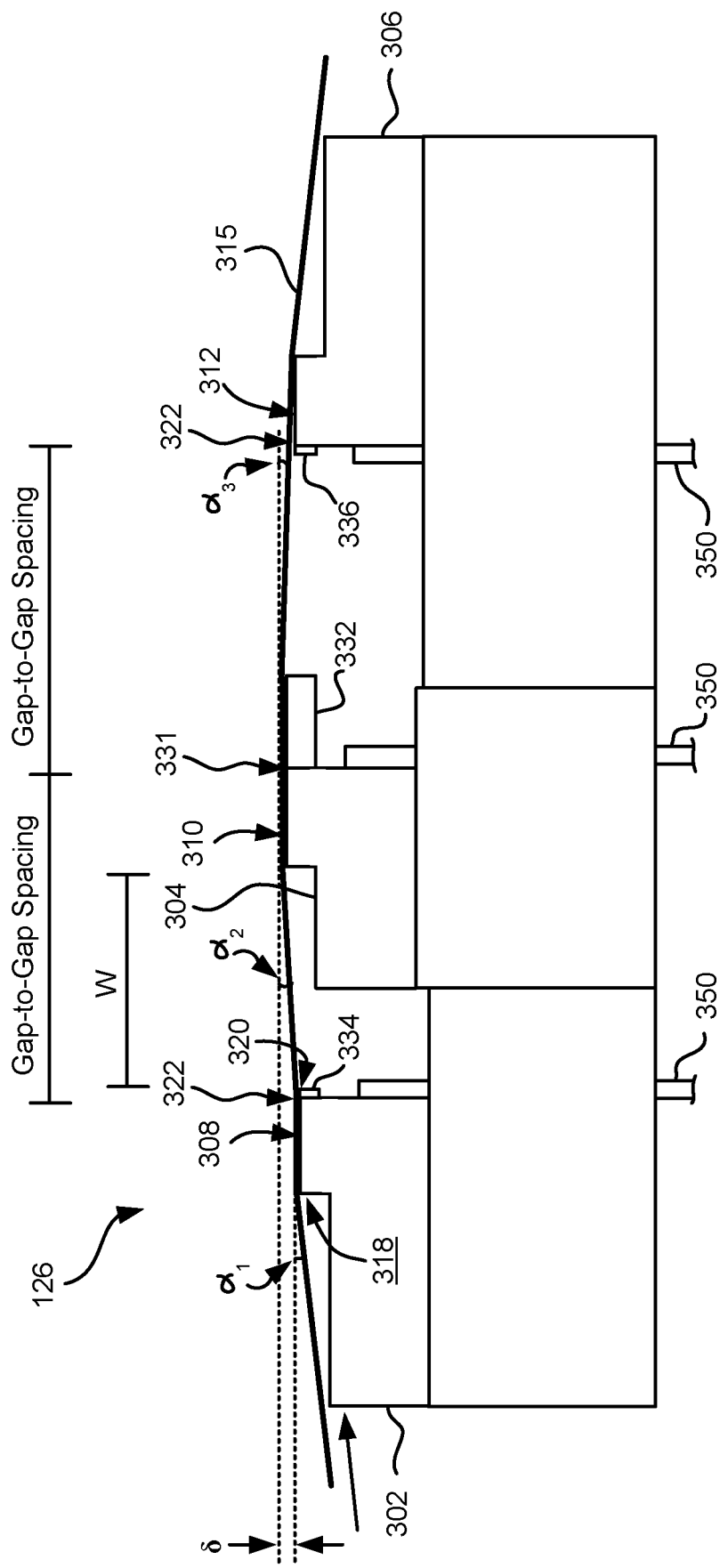
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
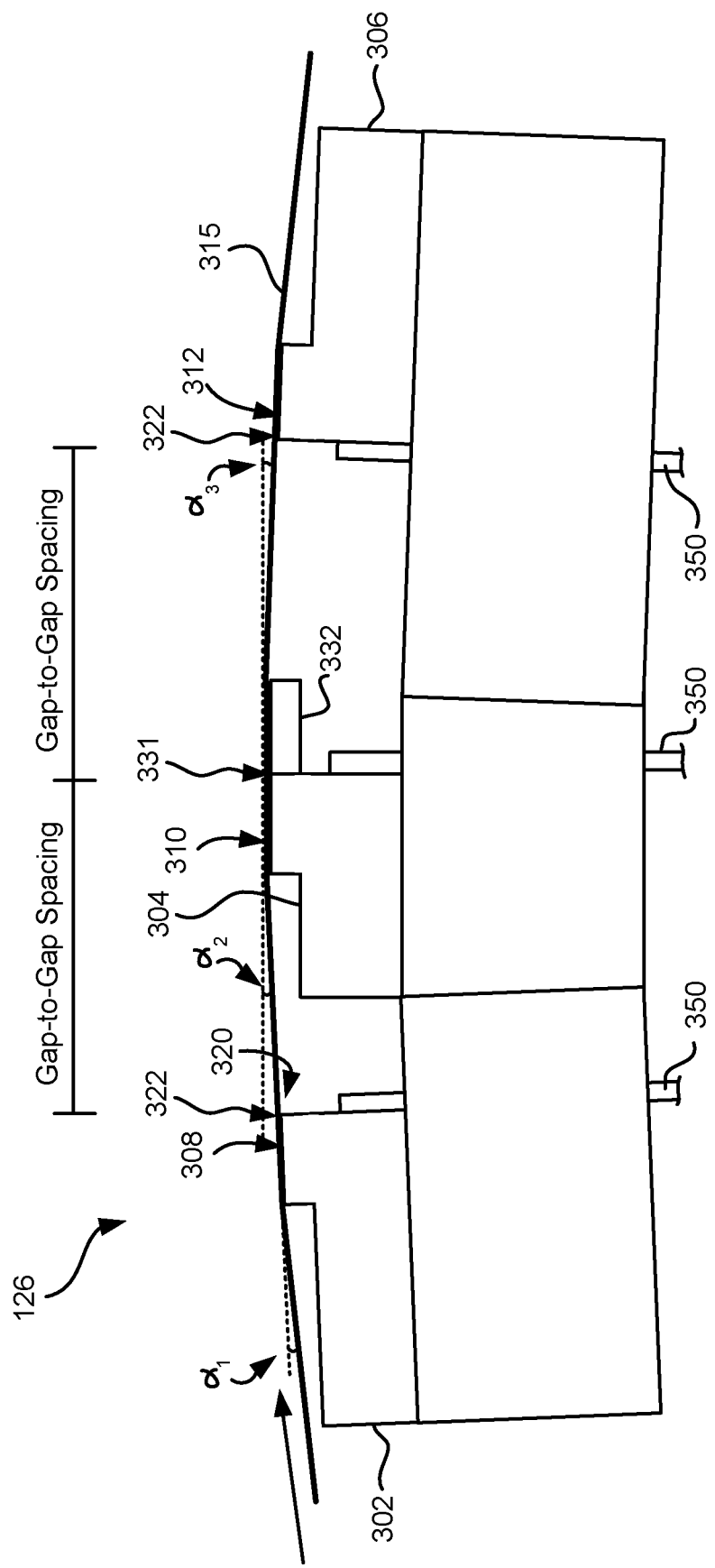
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1} (\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha 3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape-open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
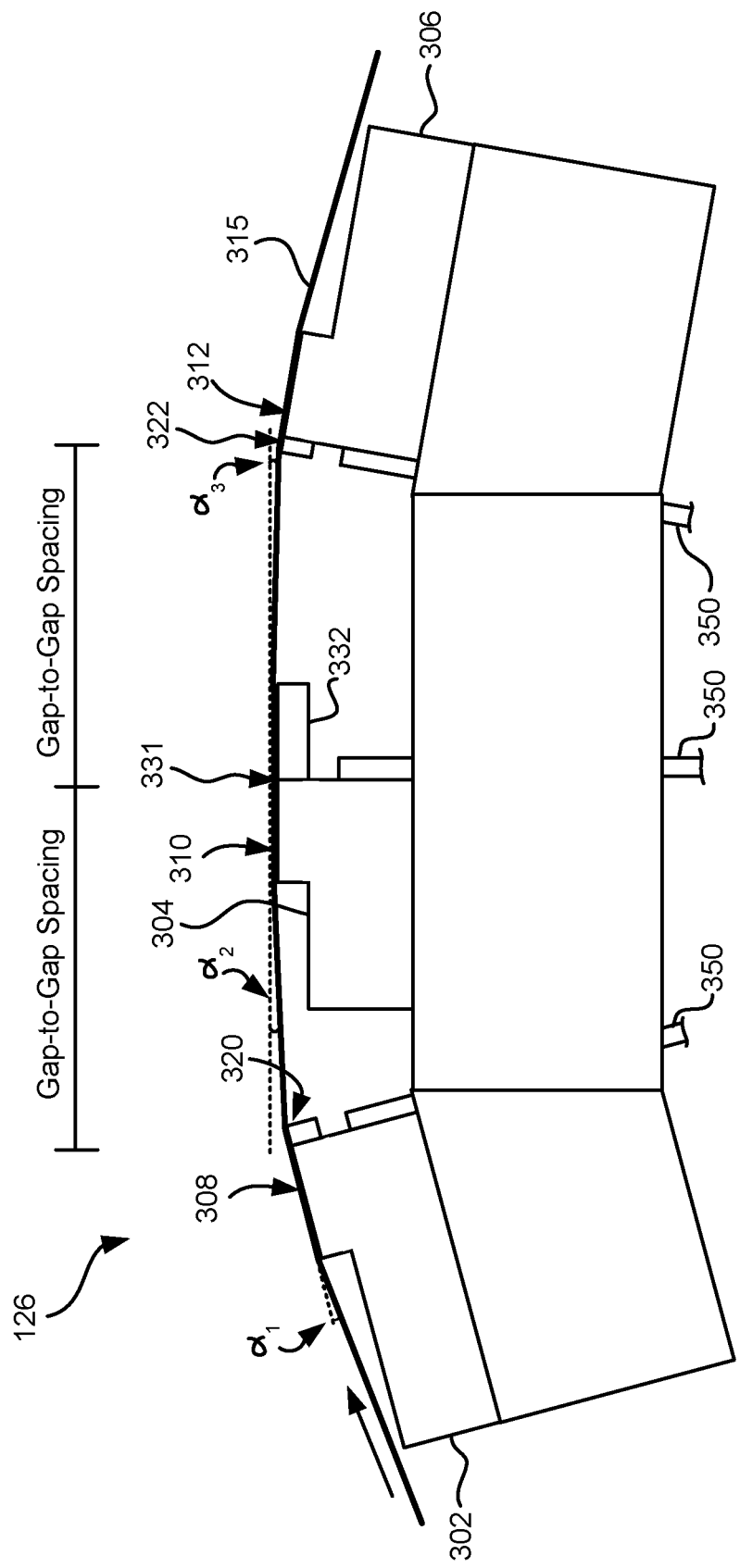
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
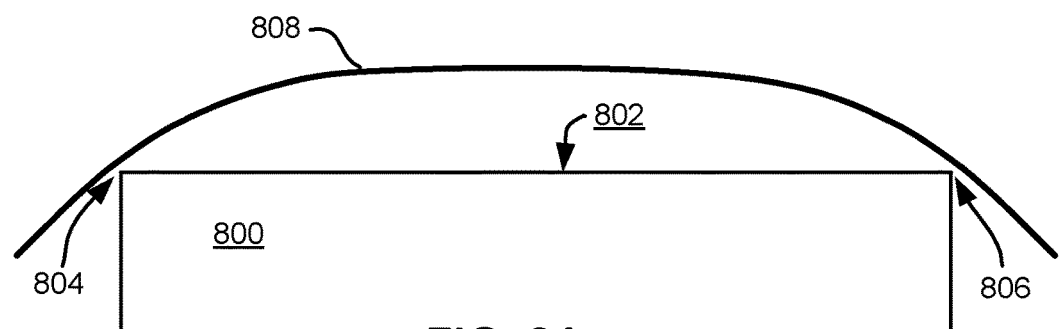
FIGS. 8A-8C are schematics depicting the principles of tape tenting.
Figure 8B:
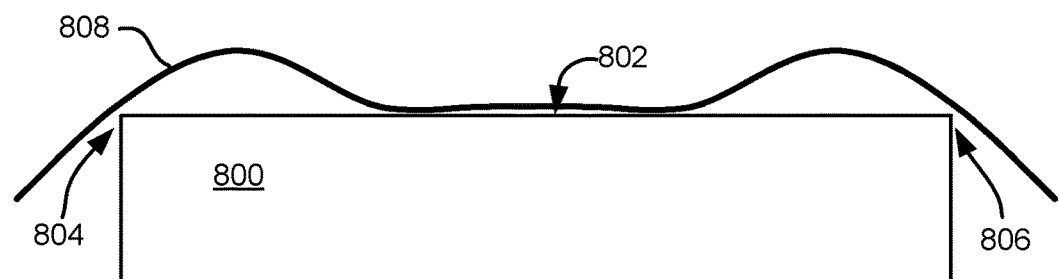
Figure 8C:
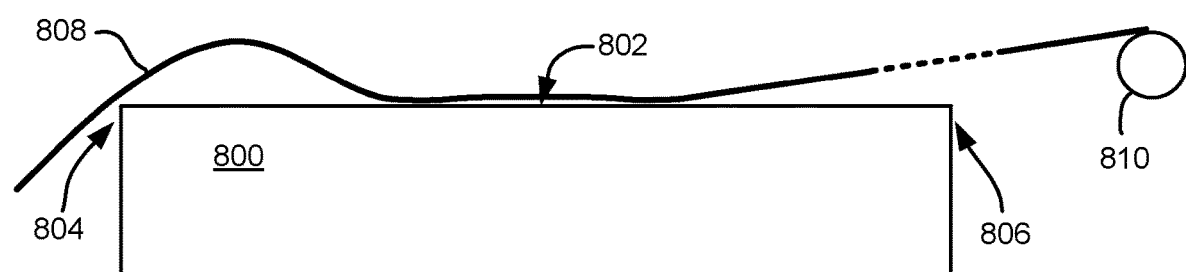

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
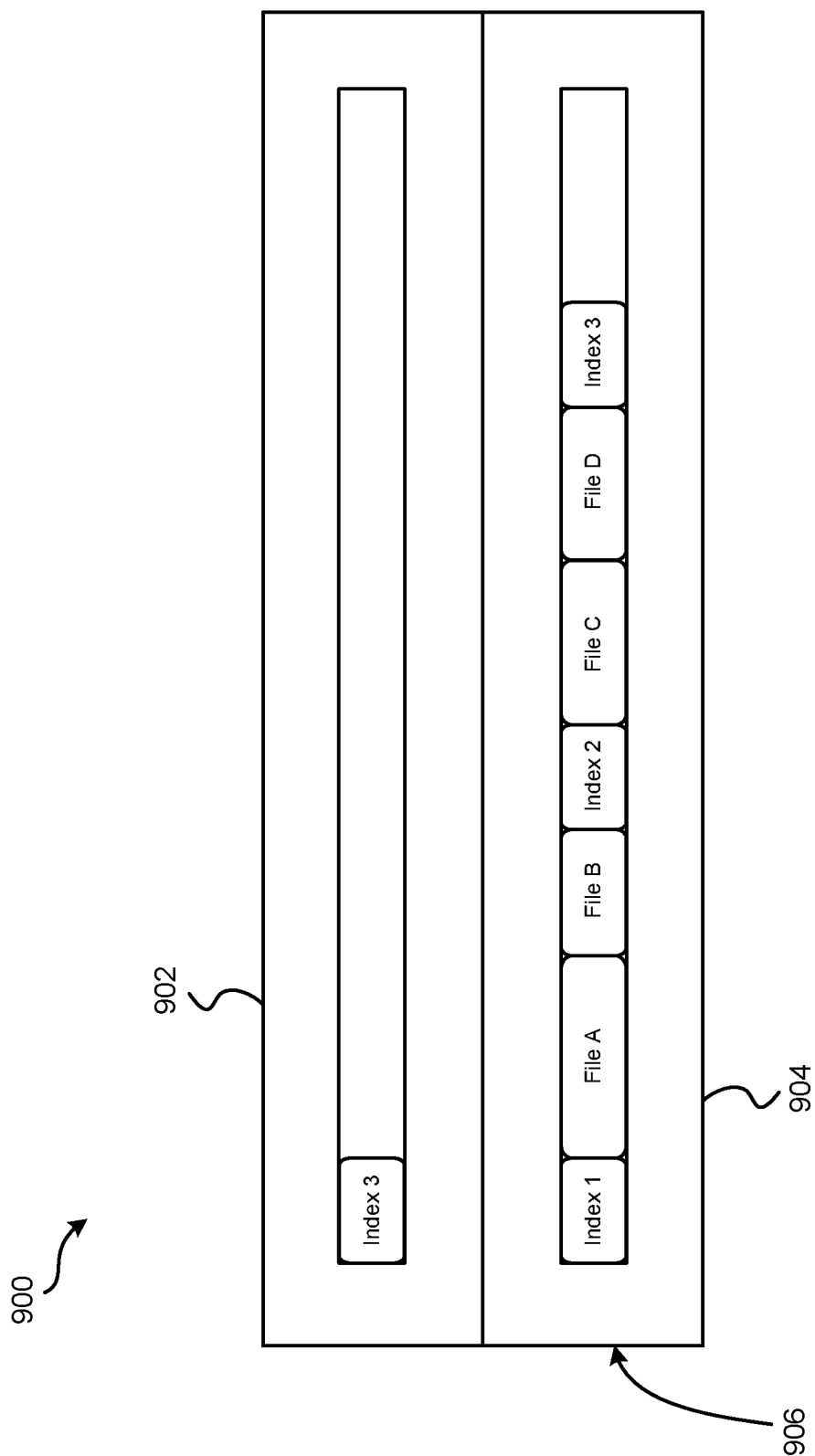
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 differently depending on the desired embodiment. According to some embodiments, the metadata of the index partition 902 may be updated in response to the tape being unmounted, e.g., such that the index may be read from the index partition when that tape is mounted again. The metadata may also be written in the data partition 902 so the tape may be mounted using the metadata recorded in the data partition 902, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As previously mentioned, an important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems. For instance, write poles in conventional magnetic tape heads may saturate when attempting to write to magnetic media having high coercivity.

Single track hard disk drive (HDD) heads attempt to overcome this issue by including transducers in which the entire pole tip is comprised of a high moment alloy. However, this configuration is not compatible magnetic tape recording, as it is difficult to control magnetic properties of high moment films on sloped portions of the magnetic tape transducer structure, in addition to increasing the susceptibility to corrosion during machining fabrication of the plurality of transducers included on a given tape head. Furthermore, conventional high moment write heads, which are designed to write to thin film HDD media, are not able to efficiently write to relatively thick (particulate) magnetic tape media coating, which may require higher write field gradients.

In sharp contrast to the foregoing shortcomings, various embodiments described herein address issues conventionally associated with implementing multichannel tape heads for writing to high coercivity media in the attempt to increase the achievable areal density thereof. Some of the embodiments herein implement a thin film layer of a high moment material, e.g., as will be described in further detail below. This may allow for improved writing to a high coercivity tape media while maintaining sharper transitions on the tape media than conventionally achievable.

Figure 10A:
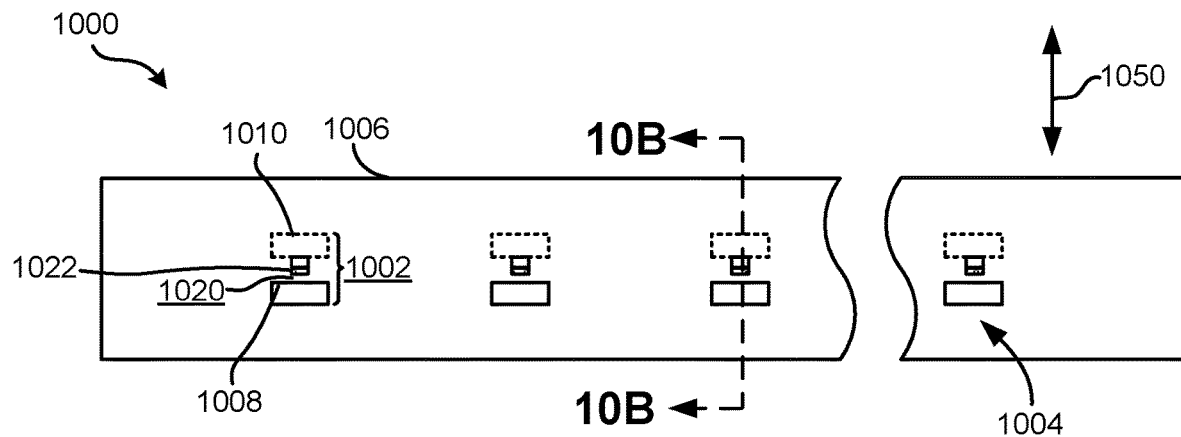
FIG. 10A is a media facing side view of a write transducer array according to one embodiment.
Figure 10B:
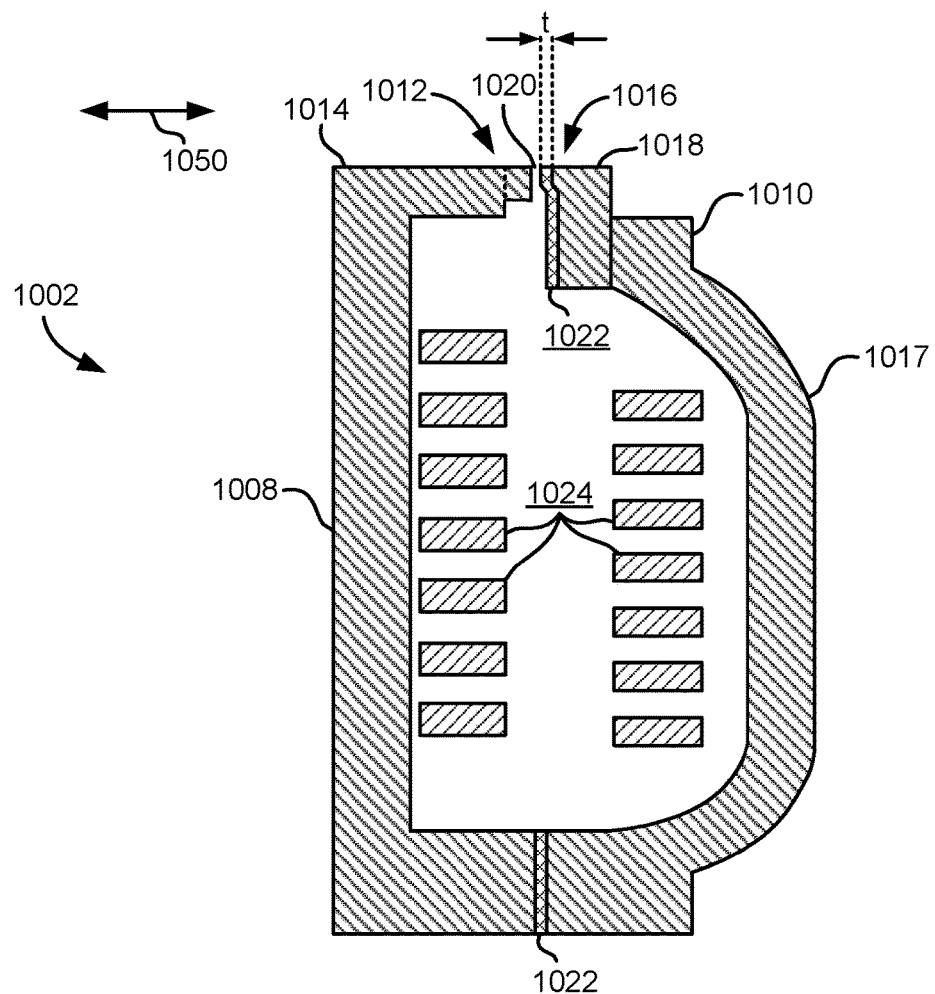
FIG. 10B is a partial cross-sectional view of a write transducer of FIG. 10A taken along line 10B-10B of FIG. 10A.

Looking to FIGS. 10A-10B, an apparatus 1000 is depicted in accordance with one embodiment. As an option, the present apparatus 1000 may be implemented in conjunction with features from any other embodiment listed herein, such as those described with reference to the other FIGS., such as FIG. 1A-8C. However, such apparatus 1000 and others presented herein may be used in various applications and/or in permutations which may or may not be specifically described in the illustrative embodiments listed herein. Further, the apparatus 1000 presented herein may be used in any desired environment. Thus FIGS. 10A-10B (and the other FIGS.) may be deemed to include any possible permutation. It should also be noted that unless otherwise specified, the various layers in this and other embodiments may be formed using conventional processes and/or materials, preferably having high magnetic permeability and low corrosion susceptibility.

As shown in FIG. 10A, apparatus 1000 includes a plurality of write transducers 1002 positioned in an array 1004 on a module 1006. The number of write transducers 1002 included in the array 1004 may vary depending on the desired approach. For instance, the array 1004 may include 16 write transducers 1002 in some approaches, while in other approaches, the array 1004 may include 32, 64, or more write transducers 1002. Furthermore, it should be noted that although only write transducers 1002 are included on module 1006 in the present embodiment, other types of transducers may be included on the same module as the write transducers in other embodiments, e.g., see servo readers 212 and readers 216 of FIGS. 2C-2D.

Referring still to FIGS. 10A-10B, each of the write transducers 1002 includes a first (e.g., lower) write pole 1008 and a second (e.g., upper) write pole 1010. According to the present description, "lower" and "upper" may refer to a position of each of the write poles with respect to each other along a deposition direction of the write transducer 1002, which is parallel to the intended direction of tape travel 1050. As alluded to above, the deposition direction may typically be oriented such that the first write pole 1008 is a lower write pole while the second write pole 1010 is an upper write pole formed above the first write pole 1008 for each of the write transducers 1002 in the array 1004. However, in other approaches the second write pole 1010 may be a lower write pole while the first write pole 1008 is an upper write pole formed above the second write pole 1010 for each of the write transducers 1002 in the array 1004.

Similarly, the intended direction of tape travel at a given point in time and/or the relative orientation of the first and second write poles 1008, 1010 may also determine which of the first and second write poles 1008, 1010 is the trailing pole. For instance, a drive mechanism (e.g., see FIG. 1A) may be configured to pass a magnetic medium (magnetic tape) over the first and second write poles 1008, 1010 in a direction such that each of the second write poles 1010 of the write transducers 1002 in the array 1004 are trailing write poles. Alternatively, a drive mechanism (e.g., see FIG. 1A) may be configured to pass a magnetic medium (magnetic tape) over the first and second write poles 1008, 1010 in a direction such that each of the first write poles 1008 of the write transducers 1002 in the array 1004 are trailing write poles. The write transducer 1002 may be used for unidirectional writing such that the first write pole 1008 is leading, and the second write pole 1010 is trailing. In this embodiment, a high moment layer 1022 is positioned proximate to the write gap 1020 on the second write pole 1010, thereby improving write performance for the write transducers 1002, e.g., which will be described in further detail below. It should also be noted that in some embodiments, one or more write transducers of an array may include a high moment layer that is coupled only to (e.g., formed on) the pole tip 1012 of the first write pole 1008, e.g., according to any of the approaches described herein.

Looking specifically to the partial cross-sectional view in FIG. 10B of one of the write transducers 1002 taken along line 10B-10B of FIG. 10A, the first write pole 1008 includes a pole tip 1012 which extends back from a media facing side 1014 of the first write pole 1008. Moreover, the second write pole 1010 also includes a respective pole tip 1016 which extends back from a media facing side 1018 of the second write pole 1010 toward a yoke portion 1017 thereof, the yoke portion 1017 including the curved portion of the second write pole 1010, as would be appreciated by one skilled in the art after reading the present description. Cross-sections of a write coil 1024 are also shown. It should be noted that although FIG. 10B only shows a partial cross-sectional view of one of the write transducers 1002, any of the layers, portions, components, etc., shown in FIG. 10B and/or the descriptions thereof may be incorporated in any one or more of the other write transducers 1002 included along the array 1004 in apparatus 1000.

A nonmagnetic write gap 1020 is additionally included between the pole tips 1012, 1016 of the first and second write poles 1008, 1010 respectively. In some approaches the write gap 1020 may be electrically conductive, e.g., rather than an electrically insulating write gap as typically implemented in conventional structures. It follows that the write gap 1020 may include a nonmagnetic metal in some approaches. As described below, a trimming process may be implemented to shape some of the write transducers included herein. By including an electrically conductive nonmagnetic metal write gap 1020, a more uniform trimming processes may be achieved for the various layers of the write transducer 1002, as would be appreciated by one skilled in the art after reading the present description. Moreover, implementing a nonmagnetic metal write gap 1020 may help minimize write gap erosion caused by the media being run thereover.

The high moment layer 1022 is positioned between the write gap 1020 and the pole tip 1016 of the second write pole 1010. According to preferred approaches, the high moment layer 1022 may be implemented as a thin film seed layer, as would be appreciated by one skilled in the art after reading the present description. Moreover, the high moment layer 1022 may be formed using any desired process, e.g., sputtering, ion-beam deposition, etc.

The high moment layer 1022 preferably includes a higher magnetic moment in the bulk material thereof than a magnetic moment of the pole tip 1016 of the second write pole 1010. The high moment layer 1022 preferably includes an alloy of iron and one or more of cobalt, nickel, aluminum and platinum. Exemplary high moment materials include cobalt-iron-nickel alloys; high concentration iron-nickel alloys, e.g., such as 78% iron-22% nickel; etc. However, in some approaches the high moment layer 1022 may include other metals therein. Accordingly, the high moment layer 1022 has a higher saturation magnetization than the remainder of the pole tip 1016, thereby allowing the high moment layer 1022 to focus flux emitted from and/or absorbed by the second write pole 1010 more effectively than conventional write poles. As mentioned above, in some embodiments, the write transducer 1002 is used for unidirectional writing such that the first write pole 1008 is leading, and the second write pole 1010 is trailing. As a result, flux may be delivered to the pole tip 1016 of the second write pole 1010 such that the flux is concentrated by the high moment material 1022 to emerge from the write transducer 1002 to write data to a magnetic medium by setting the magnetic transitions thereon. Moreover, the high moment material 1022 is able to focus a greater amount of flux than a conventional write pole before becoming saturated, thereby allowing the write transducer 1002 to more efficiently write data to magnetic media (e.g., magnetic tape) having a high coercivity while also achieving a fine granularity. Thus, implementing the high moment material 1022 as described in the present embodiment is able to improve the write performance of the write transducers 1002, as for example, when the second write pole 1010 is trailing.

The inventors were surprised to discover that the deposition thickness t of the high moment layer 1022 has an influence on the effectiveness of the second write pole 1010. More specifically, the inventors surprisingly discovered that as the deposition thickness t of the high moment layer 1022 increased beyond a certain thickness, it became less effective in focusing flux and thereby did not improve the performance of the second write pole 1010. In view of the inventors' surprising discovery, it is preferred that the deposition thickness t of the high moment layer 1022 is in a range of about 50 nm to about 400 nm, more preferably in a range of about 50 nm to about 200 nm. Again, as the deposition thickness t of the high moment layer 1022 increased above the upper bounds of these ranges, the effectiveness of the high moment layer 1022 is reduced, thereby resulting in no improvement in performance of the apparatus 1000 as a whole. It follows that the inventors also discovered that a high moment layer 1022 having a deposition thickness tin the above ranges is able to focus flux emitted from and/or absorbed by the second write pole 1010 even more effectively than a write pole having a pole tip that is fully constructed from a high moment material. Without wishing to be bound by any particular theory, the reduction in the effectiveness of the high moment layer 1022 corresponding to an increase in the deposition thickness thereof may be at least partially attributed to the lower magnetic permeability of the high moment material of the high moment layer 1022, e.g., compared to the magnetic permeability of typical write pole material such as 45/55 NiFe.

With continued reference to FIG. 10B, the placement of the high moment layer 1022 along the second write pole 1010 also influences the effectiveness of the second write pole 1010. As shown in FIG. 10B, the high moment layer 1022 does not extend along the yoke portion 1017. Attempts were made to line the yoke portion 1017 in addition to the pole tip 1016 with the high moment layer 1022, but such embodiments surprisingly did not work as well as those having a high moment layer 1022 extending solely along the pole tip 1016, e.g., as shown in FIG. 10B. While not wishing to be bound by any particular theory, it is believed that it is more difficult to preserve the magnetic properties of high moment materials when forming one or more of the high moment materials on a sloped surface, for example having a slope angle of greater than 3 degrees. Thus, the high moment layer 1022 is preferably not included along the curved yoke portion 1017. However, it should be noted that high moment material may be implemented differently than as shown in the present embodiment, as will soon become apparent.

Figure 11A:
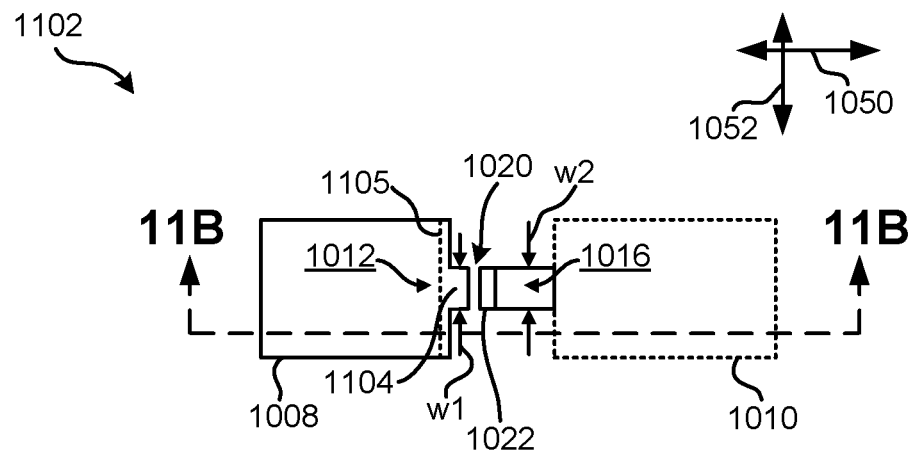
FIG. 11A is a media facing side view of a write transducer according to one embodiment.
Figure 11B:
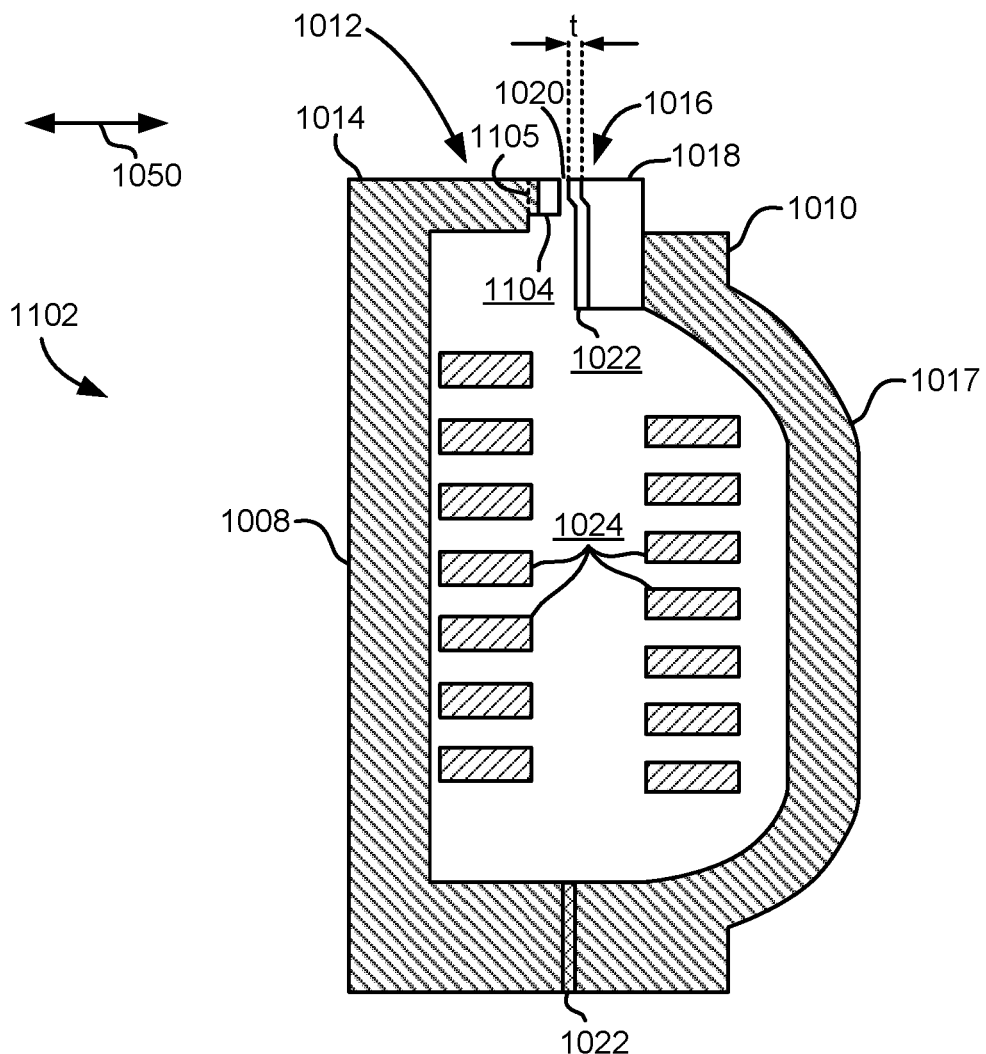
FIG. 11B is a partial cross-sectional view of the write transducer in FIG. 11A taken along line 11B-11B of FIG. 11A.

Looking to FIGS. 11A-11B, a write transducer 1102 is depicted in accordance with one embodiment. As an option, the present write transducer 1102 may be implemented in conjunction with features from any other embodiment listed herein, such as those described with reference to the other FIGS., such as FIG. 1A-10B. Specifically, FIGS. 11A-11B illustrate variations of the embodiment of FIGS. 10A-10B depicting several exemplary configurations within a write transducer 1102. Accordingly, various components of FIGS. 11A-11B have common numbering with those of FIGS. 10A-10B.

Note that such write transducer 1102 and others presented herein may be used in various applications and/or in permutations which may or may not be specifically described in the illustrative embodiments listed herein. Further, the write transducer 1102 presented herein may be used in any desired environment. Thus FIGS. 11A-11B (and the other FIGS.) may be deemed to include any possible permutation. It should also be noted that unless otherwise specified, the various layers in this and other embodiments may be formed using conventional processes and/or materials, preferably having high magnetic permeability and low corrosion susceptibility.

As shown in FIGS. 11A-11B, the pole tip 1012 of the first write pole 1008 includes a pedestal 1104 that extends from the dashed line 1105 toward the write gap. During fabrication of the write transducer 1102 (e.g., at the wafer level), the surface of the pedestal 1104 facing the write gap 1020 may be trimmed using any desired process, such as etching, milling (e.g., ion milling), etc. to form a trimmed portion having lateral edges. Accordingly, the trimmed portion of the pedestal 1104, positioned at the distal end of the pedestal 1104, may have a smaller width w1 relative to the width of the first write pole 1008 and any untrimmed portion of the pedestal 1104. By trimming the pedestal 1104 of the first write pole 1008, the fringing field created by the write transducer 1102 may be controlled (e.g., reduced), thereby desirably reducing the extent of erase bands.

As shown in the present embodiment, a width w1 of the pedestal 1104 may extend in a cross track direction 1052 (which is perpendicular to the intended direction of tape travel 1050) for a distance which is about equal to a width w2 of the pole tip 1016 of the second write pole 1010 measured in the cross track direction 1052. However, the width w1 of the trimmed portion of the pedestal 1104 may vary depending on the type and/or duration of the trimming process implemented to form the trimmed portion of the pedestal 1104, e.g., depending on the desired embodiment.

As mentioned above, more than one write transducer 1102 may be implemented in an array on a module, e.g., as shown in FIGS. 2C-2D and/or FIG. 10A. The number of write transducers 1102 included in the array may vary depending on the desired approach. For instance, the array may include 16 of the write transducers 1102 in some approaches, while in other approaches, the array may include 32, 33 or more of the write transducers 1102. Furthermore, it should be noted that other types of transducers may be included on the same module as the write transducer 1102 in other embodiments, e.g., see servo readers 212 and readers 216 of FIGS. 2C-2D.

Referring again to FIGS. 11A-11B, as described above, write transducer 1102 may be used for unidirectional writing, particularly where the high moment layer 1022 is only positioned on one side of the write gap 1020. Again, in this embodiment, the intended direction of tape travel may be directed such that the second write pole 1010 and high moment layer 1022 are trailing compared to the first write pole 1008, which is leading. However, some embodiments may include a second high moment layer on an opposite side of the write gap 1020 as high moment layer 1022 thereby enabling bi-directional recording, as will soon become apparent.

Looking to FIGS. 12A-12H, several write transducers 1202, 1222, 1242, 1262 are depicted in accordance with several embodiments. As an option, any one of the write transducers 1202, 1222, 1242, 1262 may be implemented in conjunction with features from any other embodiment listed herein, such as those described with reference to the other FIGS., such as FIG. 1A-10B. Specifically, FIGS. 12A-12H illustrate variations of the embodiment of FIGS. 10A-10B depicting several exemplary configurations within several write transducers 1202, 1222, 1242, 1262. Accordingly, various components of FIGS. 12A-12H have common numbering with those of FIGS. 10A-10B.

However, such write transducers 1202, 1222, 1242, 1262 and others presented herein may be used in various applications and/or in permutations which may or may not be specifically described in the illustrative embodiments listed herein. Further, the write transducers 1202, 1222, 1242, 1262 presented herein may be used in any desired environment. Thus FIGS. 12A-12H (and the other FIGS.) may be deemed to include any possible permutation. It should also be noted that unless otherwise specified, the various layers in these and other embodiments may be formed using conventional processes and/or materials, preferably having high magnetic permeability and low corrosion susceptibility.

Figure 12A:
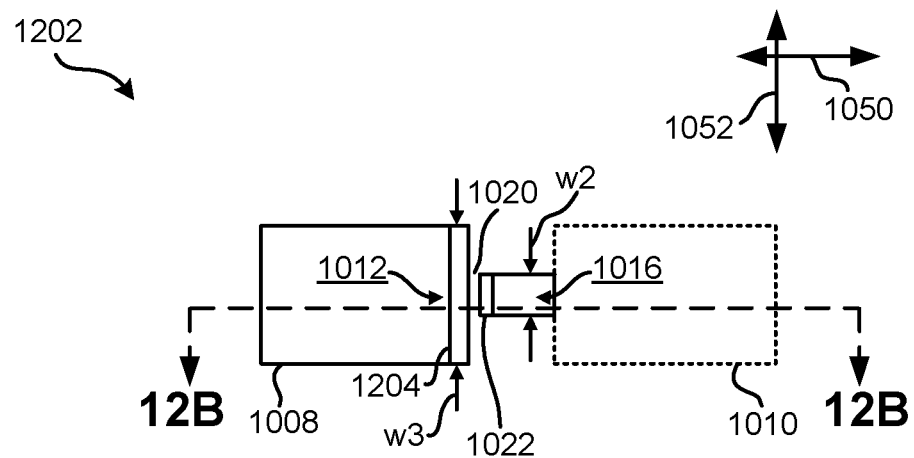
FIG. 12A is a media facing side view of a write transducer according to one embodiment.
Figure 12B:
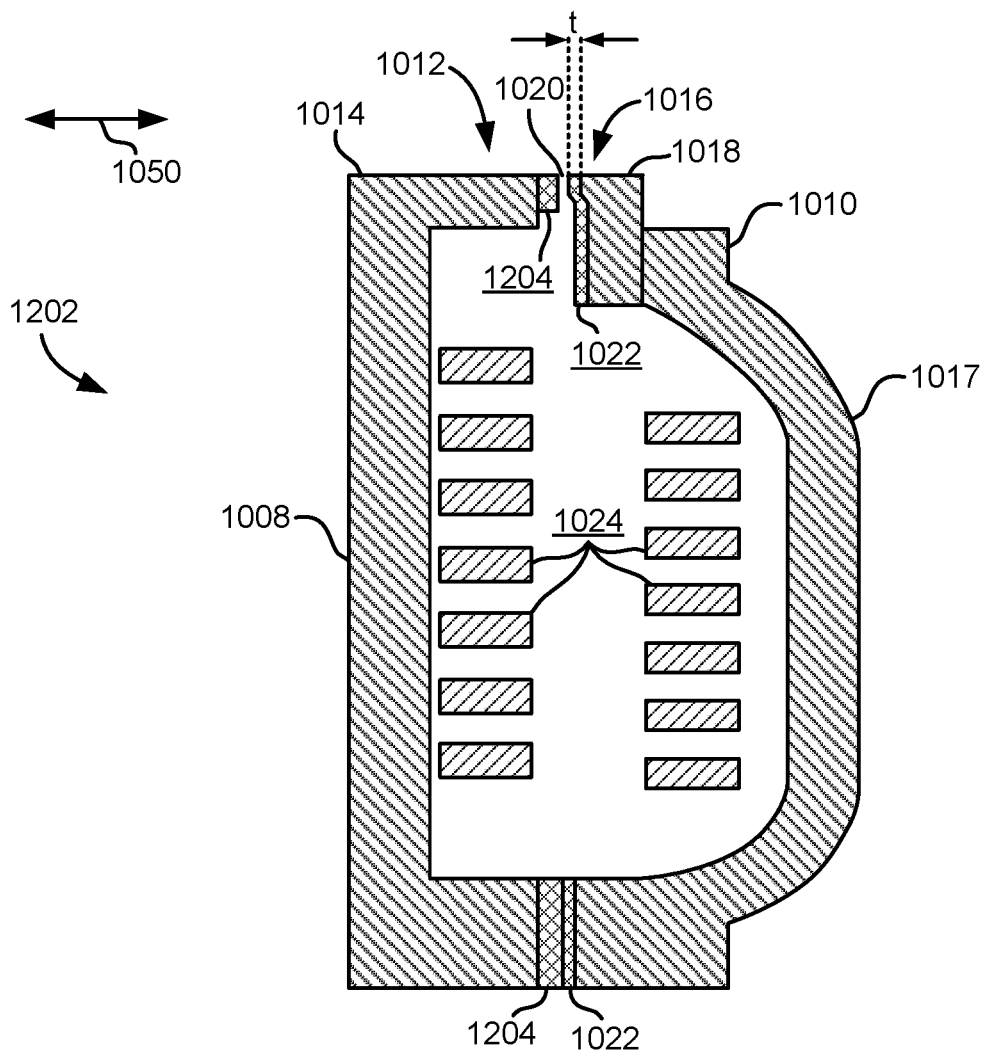
FIG. 12B is a partial cross-sectional view of the write transducer in FIG. 12A taken along line 12B-12B of FIG. 12A.

As shown in FIGS. 12A-12B, in addition to high moment layer 1022, a second high moment layer 1204 is included between the write gap 1020 and the pole tip 1012 of the first write pole 1008. According to preferred approaches, the second high moment layer 1204 may be implemented as a thin film layer, and may be formed using any desired process, e.g., plating, sputtering, ion-beam deposition, etc.

According to the present embodiment, a width w3 of the second high moment layer 1204 extends along the pole tip 1012 of the first write pole 1008 in a cross track direction 1052 for a distance greater than a width w2 of the pole tip 1016 of the second write pole 1010 measured in the same cross track direction 1052. In some approaches, the second high moment layer 1204 may be deposited (e.g., full film) on a write gap-facing surface of the pole tip 1012 of the first write pole 1008. It follows that the width w3 of the second high moment layer 1204 may extend about as wide as the pole tip 1012 of the first write pole 1008.

Although the high moment layer 1022 and the second high moment layer 1204 may not have equal (the same) deposition thicknesses, e.g., resulting from being formed by different processes, the inventors made a surprising discovery that the deposition thickness of a high moment layer (e.g., 1022, 1204) has an influence on the effectiveness of the respective write pole. More specifically, the inventors surprisingly discovered that as the deposition thickness of a high moment layer increased beyond a certain thickness, it became less effective in focusing flux and thereby does not improve the performance of the respective write pole. Thus, a deposition thickness of the high moment layer 1022 and/or the second high moment layer 1204 is preferably in a range of about 50 nm to about 400 nm, more preferably in a range of about 75 nm to about 200 nm. However, in some approaches the second high moment layer 1204 may have a thickness that is thicker than the above ranges due to limitations of the formation process (e.g., plating) of the second high moment layer 1204. Although the thickness of the second high moment layer 1204 may be greater than the preferred ranges, improvements to the one or more write transducers and the module on which they are positioned may be achieved by simply including the second high moment layer 1204 to produce a symmetrical write gap.

The second high moment layer 1204 preferably has a higher magnetic moment in the bulk material thereof than a magnetic moment of the pole tip 1012 of the first write pole 1008. The second high moment layer 1204 may include one or more of the same materials as high moment layer 1022, but may have a different composition in some approaches. It follows that the second high moment layer 1204 preferably includes an alloy of iron and one or more of cobalt, nickel, aluminum and platinum. However, in some approaches the second high moment layer 1204 may include other metals therein. Accordingly, the second high moment layer 1204 has a higher saturation magnetization than the remainder of the pole tip 1012, thereby allowing the second high moment layer 1204 to focus flux emitted from and/or absorbed by the first write pole 1008 more effectively than conventional write poles.

By implementing the second high moment layer 1204, the write transducer 1202 no longer has an asymmetrical write gap, e.g., as seen in FIGS. 10A-11B. Rather, a high moment layer is positioned on either side of the write gap 1020, thereby achieving improved write performance regardless of which one of the first or second write poles 1008, 1010 are trailing, as dependent upon the given direction of tape travel. As a result, flux may be delivered to either pole tip 1012, 1016 of the write poles 1008, 1010 where the flux is concentrated by the respective high moment material 1022, 1204 to emerge from the write transducer 1202 to write data to a magnetic medium. Moreover, the high moment materials 1022, 1204 are each able to focus a greater amount of flux than a conventional write pole before becoming saturated, thereby allowing the write transducer 1202 to efficiently write data to magnetic media (e.g., magnetic tape) having a high coercivity while also achieving a fine granularity. Moreover, the symmetrical write gap 1020 allows for the aforementioned improvements to be achieved for either intended direction of tape travel 1050.

Figure 12C:
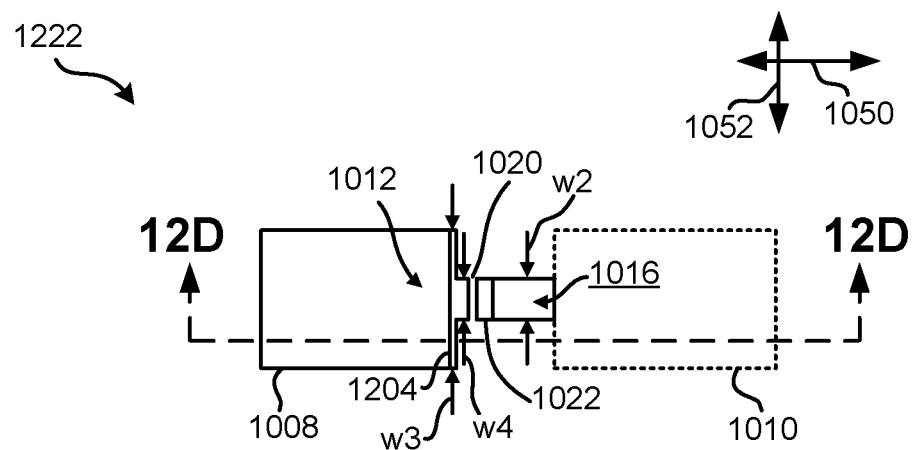
FIG. 12C is a media facing side view of a write transducer according to one embodiment.
Figure 12D:
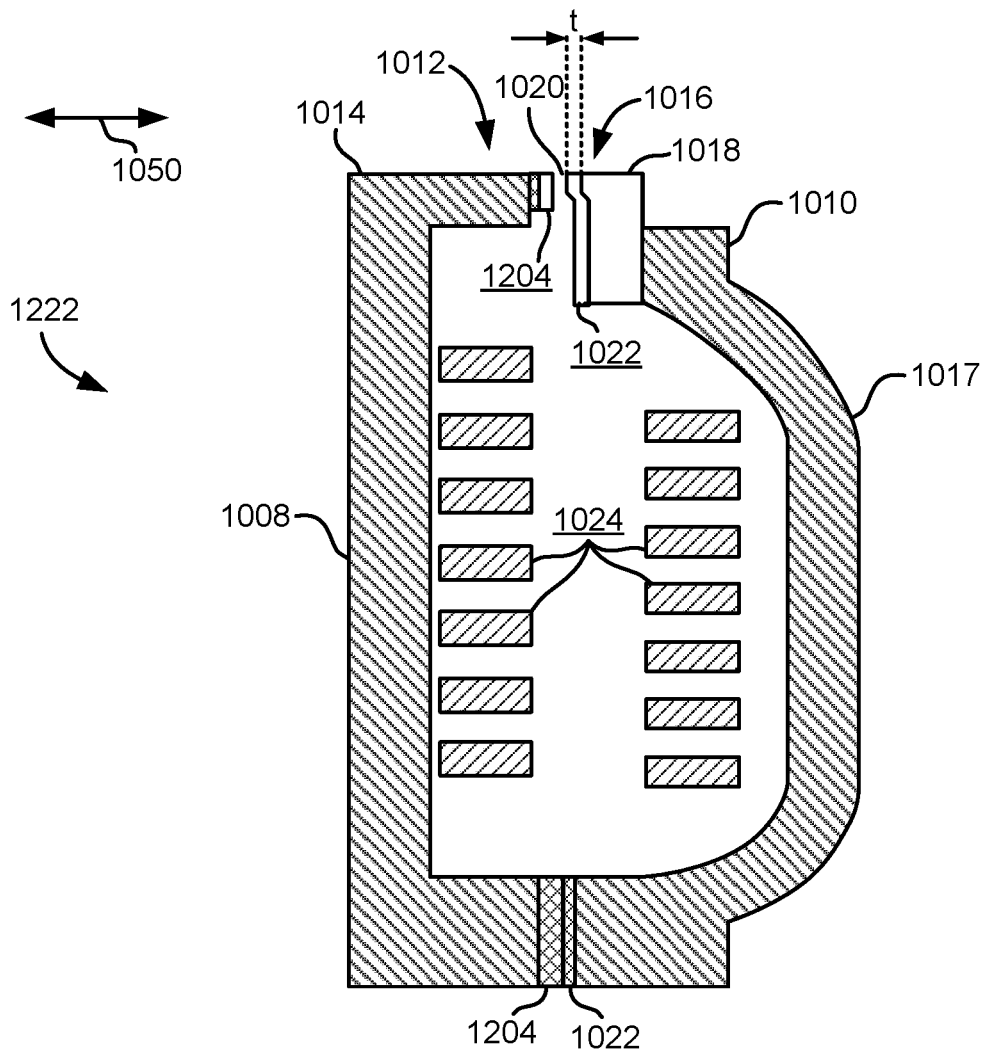
FIG. 12D is a partial cross-sectional view of the write transducer in FIG. 12C taken along line 12D-12D of FIG. 12C.

In some approaches, the write transducer configuration illustrated in FIGS. 12A-12B may be processed by trimming a write gap-facing side of the second high moment layer 1204, thereby resulting in the write transducer configuration illustrated in FIGS. 12C-12D. As shown, the second high moment layer 1204 has a trimmed portion that extends toward the write gap 1020. The trimming performed on the second high moment layer 1204 may be performed during fabrication of the write transducer 1202, by etching, milling (e.g., ion milling), etc., the surface of the first write pole 1008 facing the write gap 1020. As mentioned above, by trimming the second high moment layer 1204 to form the trimmed portion of the second high moment layer 1204, the fringing field created by the write transducer 1202 may be controlled (e.g., reduced), thereby desirably reducing the extent of erase bands. The inventors found that the fringing field is smaller and symmetrical when both pole tips contain the same material.

The width w3 of the second high moment layer 1204 at the widest portion thereof may still extend along the pole tip 1012 of the first write pole 1008 in a cross track direction 1052 for a distance greater than a width w2 of the pole tip 1016 of the second write pole 1010 measured in the same direction. However, a width w4 of the trimmed portion of the second high moment layer 1204 may extend in a cross track direction 1052 for a distance which is about equal to a width w2 of the pole tip 1016 of the second write pole 1010. In other approaches, the width w4 and/or w3 of either portion of the second high moment layer 1204 may vary depending on the type and/or duration of the trimming process implemented to form the trimmed portion of the second high moment layer 1204, e.g., depending on the desired embodiment.

It should be noted that the configuration illustrated in FIGS. 12C-12D may be formed by implementing different processes. For example, the non-trimmed portion of the second high moment layer 1204 (having the wider width w3) may be deposited across the entire pole 1014, while the trimmed portion of the second high moment layer 1204 (having the narrower width w4) may be formed by masking and depositing (e.g., sputtering).

Although the high moment layer 1022 and the second high moment layer 1204 may not have equal (the same) deposition thicknesses, it is preferred that the respective thicknesses thereof are in a range of about 50 nm to about 400 nm, more preferably in a range of about 75 nm to about 200 nm, e.g., in view of the surprising results discovered by the inventors as described above. Looking to the side of the write transducer 1202 opposite a media facing surface 1014 thereof, a portion of the second high moment layer 1204 may be thinner than a deposition thickness of the portion of the second high moment layer 1204 adjacent the media facing surface 1014 of the write transducer 1202. Accordingly, the portion of the second high moment layer 1204 adjacent the side of the write transducer 1202 opposite the media facing surface 1014 may be in a range of about 50 nm to about 400 nm, more preferably in a range of about 75 nm to about 200 nm, but may be higher or lower depending on the desired embodiment.

Figure 12E:
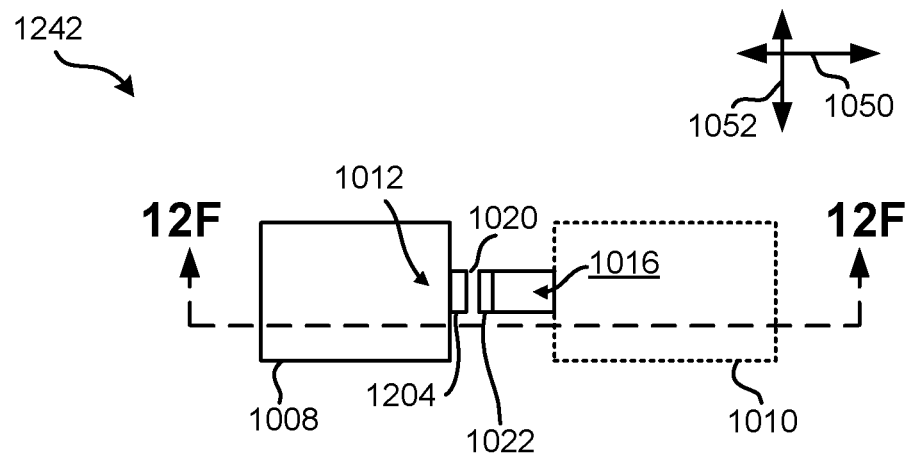
FIG. 12E is a media facing side view of a write transducer according to one embodiment.
Figure 12F:
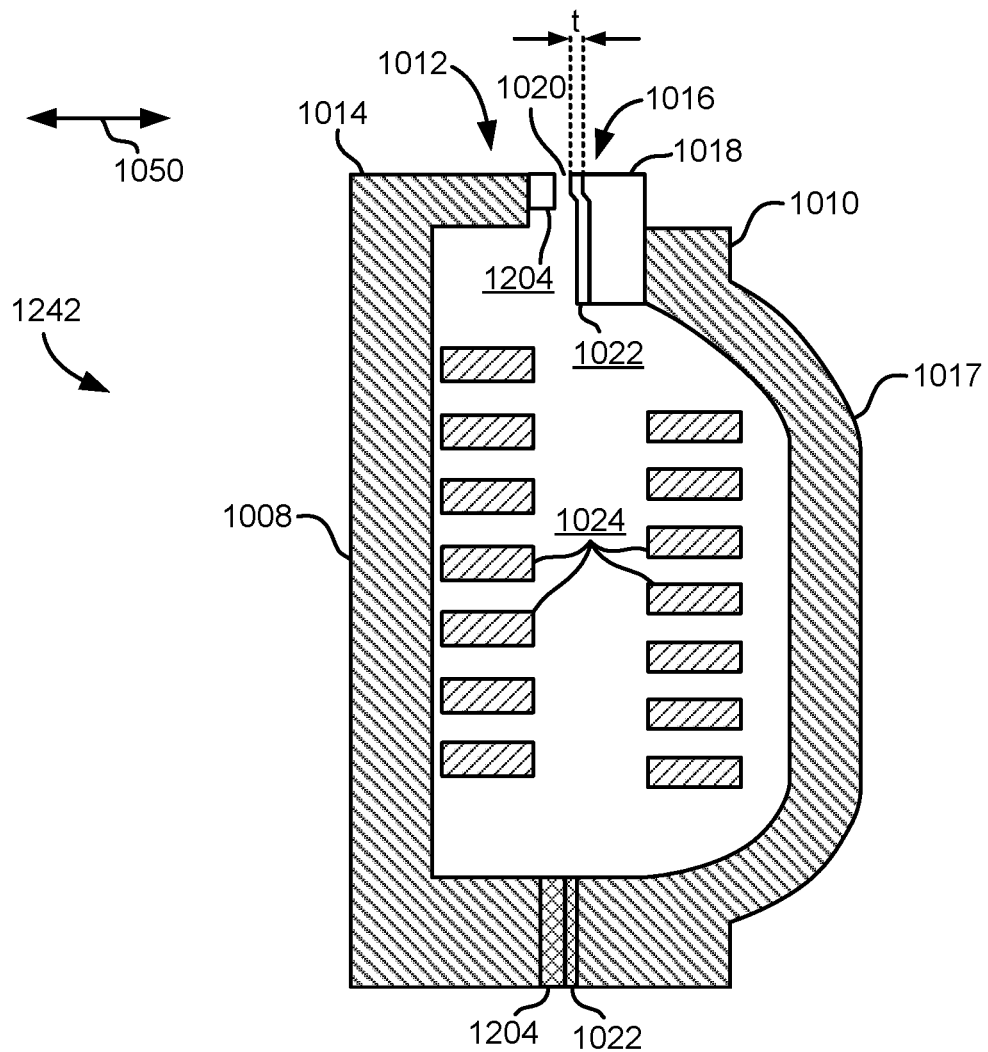
FIG. 12F is a partial cross-sectional view of the write transducer in FIG. 12E taken along line 12F-12F of FIG. 12E.

In some approaches, the write transducer configuration illustrated in FIGS. 12C-12D may be processed by etching, milling (e.g., ion milling), etc., the non-trimmed portion of the second high moment layer 1204 (having the wider width w3), thereby resulting in the write transducer configuration illustrated in the write transducer 1242 of FIGS. 12E-12F.

As shown in FIGS. 12E-12F, the second high moment layer 1204 of write transducer 1242 has been processed (e.g., etched) such that only the trimmed portion thereof remains. In other words, the second high moment layer 1204 may be processed such that portions of the second high moment layer 1204 no longer remain along the write gap-facing surface of the pole tip 1012 of the first write pole 1008. The portion of the second high moment layer 1204 that still remains may extend along the pole tip 1012 of the first write pole 1008 for a distance that is about equal to the width of the pole tip 1016 of the second write pole 1010 measured in the same direction. It follows that the second high moment layer 1204 may be processed in some approaches without affecting the width of the trimmed portion thereof.

Figure 12G:
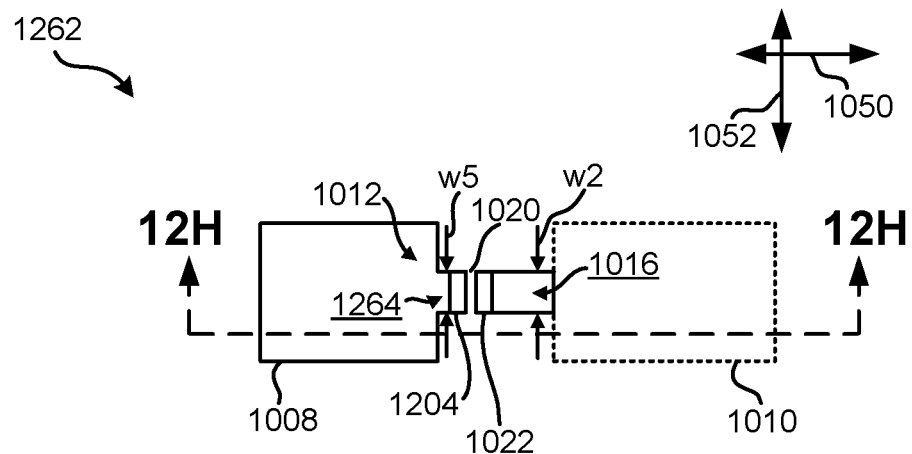
FIG. 12G is a media facing side view of a write transducer according to one embodiment.
Figure 12H:
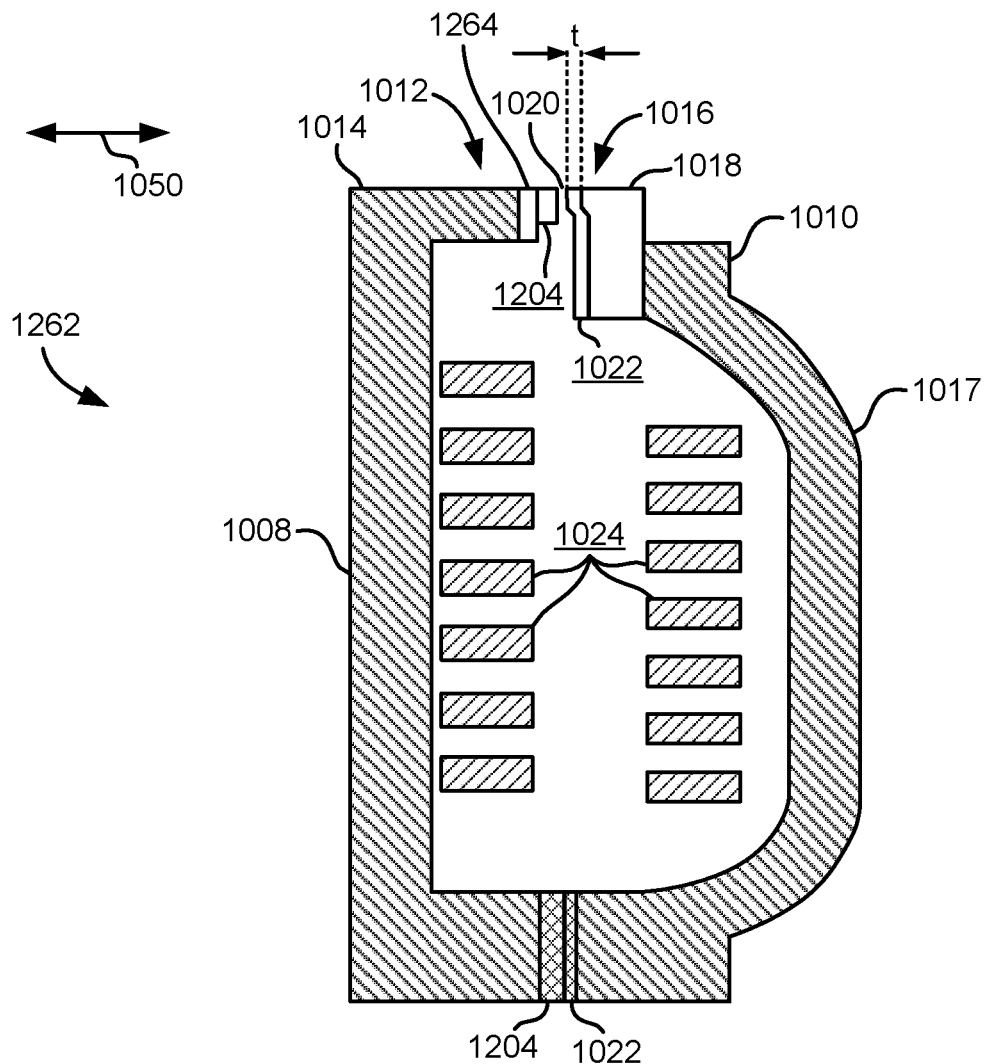
FIG. 12H is a partial cross-sectional view of the write transducer in FIG. 12G taken along line 12H-12H of FIG. 12G.

In still other approaches, the write transducer configuration illustrated in FIGS. 12E-12F may be processed by etching, milling (e.g., ion milling), etc., the non-trimmed portion of the first write pole 1008, thereby resulting in the write transducer configuration illustrated in the write transducer 1262 of FIGS. 12G-12H.

As shown in FIGS. 12G-12H, the processing (e.g., trimming) is preferably performed on the write gap-facing surface of the first write pole 1008. The trimming of the pole tip 1012 of the first pole 1008 may create a portion 1264 that extends from the first pole 1008 toward the write gap 1020. A width w5 of the portion extends in a cross track direction 1052 for a distance about equal to a width w2 of the pole tip 1016 of the second write pole 1010 measured in the same cross track direction 1052.

In preferred approaches, the second high moment layer 1204 may still extend along the pole tip 1012 of the first write pole 1008 for a distance that is about equal to the width w2 of the pole tip 1016 of the second write pole 1010, as well as width w5, measured in the same cross track direction 1052.

It follows that various embodiments included herein are able to improve performance when writing to high coercivity media. The inventors were able to achieve surprising results by implementing thin film layers of high moment materials as described in the different configurations above, thereby increasing the achievable areal density of magnetic tape beyond what was conventionally possible. This improvement is realized particularly when writing to magnetic media having high coercivity, e.g., such as BaFe media having perpendicular magnetic orientation. Thus, various embodiments included herein are able to achieve improved writing to high coercivity tape media while maintaining sharper transitions on the tape media than conventionally achievable.

Figure 13A:
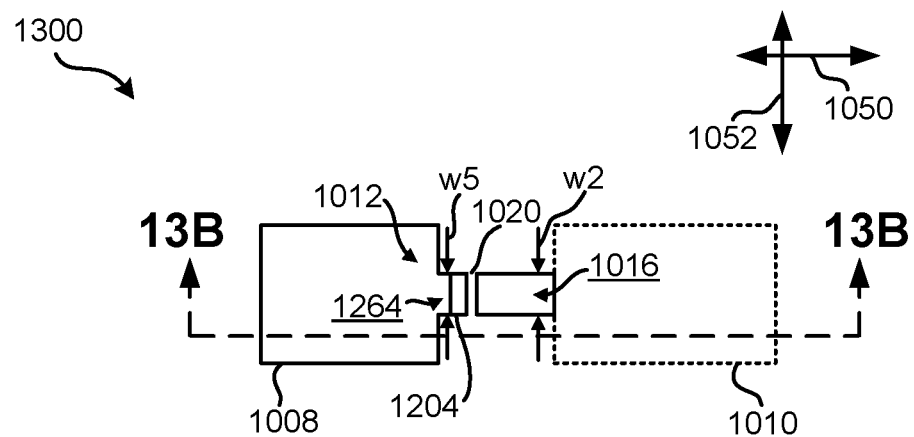
FIG. 13A is a media facing side view of a write transducer according to one embodiment.
Figure 13B:
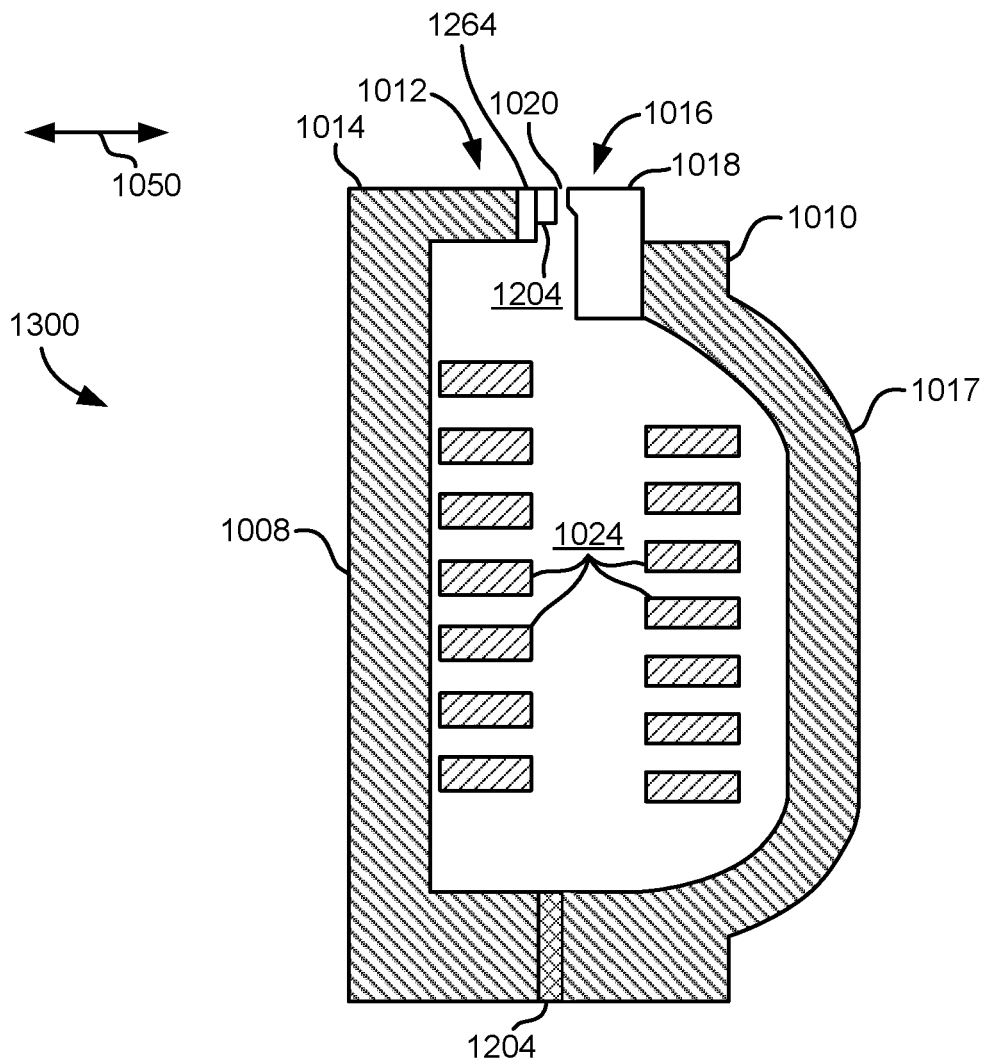
FIG. 13B is a partial cross-sectional view of the write transducer in FIG. 13A taken along line 13B-13B of FIG. 13A.

FIGS. 13A-13B depict an apparatus 1300 is depicted in accordance with one embodiment. As an option, the present apparatus 1300 may be implemented in conjunction with features from any other embodiment listed herein, such as those described with reference to the other FIGS., such as FIG. 1A-8C. However, such apparatus 1300 and others presented herein may be used in various applications and/or in permutations which may or may not be specifically described in the illustrative embodiments listed herein. Further, the apparatus 1300 presented herein may be used in any desired environment. Thus FIGS. 13A-13B (and the other FIGS.) may be deemed to include any possible permutation. It should also be noted that unless otherwise specified, the various layers in this and other embodiments may be formed using conventional processes and/or materials, preferably having high magnetic permeability and low corrosion susceptibility.

Apparatus 1300 is similar to write transducer 1262 of FIG. 12H, and accordingly has common numbering therewith. Apparatus 1300 includes a high moment layer 1204 between the write gap 1020 and the pole tip 1012 of the first write pole 1008. However, a high moment layer is not present between the write gap 1020 and the pole tip 1016 of the second write pole 1010.

It will be clear that the various features of the foregoing systems and/or methodologies may be combined in any way, creating a plurality of combinations from the descriptions presented above.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
an array of write transducers, each write transducer having:
a first write pole having a pole tip extending from a media facing side of the first write pole;
a second write pole formed above the first write pole, the second write pole having a pole tip extending from a media facing side of the second write pole;
a nonmagnetic write gap between the pole tips of the write poles;
a first high moment layer between the write gap and the pole tip of the second write pole, the first high moment layer having a higher magnetic moment than a magnetic moment of the pole tip of the second write pole, wherein the first high moment layer includes an alloy of iron and at least a second material that includes aluminum and/or platinum; and
a second high moment layer between the write gap and a pedestal of the pole tip of the first write pole, the second high moment layer having a higher magnetic moment than a magnetic moment of the pole tip of the first write pole,
wherein the second high moment layer includes an alloy of iron and at least a second material selected from the group consisting of: cobalt, nickel, aluminum, and platinum,
wherein the pedestal of the pole tip of the first write pole extends toward the write gap,
wherein a length of the pedestal measured along a direction perpendicular to the media facing side of the first write pole is less than a length of a remainder of the pole tip of the first write pole measured along the direction perpendicular to the media facing side of the first write pole,
wherein the pedestal includes a trimmed portion having a width extending in a cross track direction for only a portion of a width of the first write pole measured in the same direction,
wherein the width of the trimmed portion of the pedestal extends in the cross track direction for a distance about equal to a width of the pole tip of the second write pole measured in the same direction,
wherein the first high moment layer connects back ends of the first and second write poles positioned on an opposite side of write coils than the media facing side of the first write pole and the media facing side of the second write pole,
wherein a deposition thickness of the first high moment layer is uniform,
wherein a width of the first high moment layer between the write gap and the pole tip of the second write pole is about equal to the width of the pole tip of the second write pole.

2. An apparatus as recited in claim 1, wherein the pedestal has a same composition as the remainder of the first write pole.

3. An apparatus as recited in claim 1, wherein a width of a non-trimmed portion of the pedestal extends in the cross track direction for a distance about equal to a width of the remainder of the pole tip of the first write pole measured in the same direction.

4. An apparatus as recited in claim 1, wherein, for at least one of the write transducers, the deposition thickness of the first high moment layer is in a range of about 50 nm to about 400 nm.

5. An apparatus as recited in claim 1, wherein the first and second high moment layers connect the back ends of the first and second write poles positioned on the opposite side of the write coils than the media facing side of the first write pole and the media facing side of the second write pole.

6. An apparatus as recited in claim 5, wherein the first and second high moment layers are directly coupled to each other.

7. An apparatus as recited in claim 5, wherein the deposition thickness of the first high moment layer is less than a deposition thickness of the second high moment layer.

8. An apparatus, comprising:
an array of write transducers, each write transducer having:
a first write pole having a pole tip extending from a media facing side of the first write pole;
a second write pole formed above the first write pole, the second write pole having a pole tip extending from a media facing side of the second write pole;
a nonmagnetic write gap between the pole tips of the write poles;
a first high moment layer between the write gap and the pole tip of the second write pole, the first high moment layer having a higher magnetic moment than a magnetic moment of the pole tip of the second write pole; and
a second high moment layer between the write gap and the pole tip of the first write pole, the second high moment layer having a higher magnetic moment than a magnetic moment of the pole tip of the first write pole,
wherein the pole tip of the first write pole has a pedestal extending toward the write gap,
wherein a length of the pedestal measured along a direction perpendicular to the media facing side of the first write pole is less than a length of a remainder of the pole tip of the first write pole measured along the direction perpendicular to the media facing side of the first write pole,
wherein the pedestal includes a trimmed portion having a width extending in a cross track direction for only a portion of a width of the first write pole measured in the same direction,
wherein the first and second high moment layers connect back ends of the first and second write poles positioned on an opposite side of write coils than the media facing side of the first write pole and the media facing side of the second write pole,
wherein a deposition thickness of the first high moment layer is uniform,
wherein a width of the first high moment layer between the write gap and the pole tip of the second write pole is about equal to a width of the pole tip of the second write pole, wherein the second write pole is comprised of a yoke portion and the pole tip, wherein the first high moment layer does not extend along the yoke portion, wherein the second high moment layer includes an alloy of iron and at least a second material selected from the group consisting of: cobalt, nickel, aluminum, and platinum.

9. An apparatus as recited in claim 8, wherein the pedestal has a same composition as the remainder of the first write pole.

10. An apparatus as recited in claim 8, wherein the width of the trimmed portion of the pedestal extends in the cross track direction for a distance about equal to the width of the pole tip of the second write pole, wherein a width of a non-trimmed portion of the pedestal extends in the cross track direction for a distance about equal to a width of the remainder of the pole tip of the first write pole measured in the same direction.

11. An apparatus as recited in claim 8, wherein the second high moment layer extends along the pole tip of the first write pole in a cross track direction for a distance about equal to the width of the pole tip of the second write pole measured in the same direction.

12. An apparatus as recited in claim 8, wherein the width of the trimmed portion of the pedestal extends in the cross track direction for a distance about equal to the width of the pole tip of the second write pole measured in the same direction.

13. An apparatus as recited in claim 8, wherein the first and second high moment layers are directly coupled to each other, wherein the deposition thickness of the first high moment layer is less than a deposition thickness of the second high moment layer.

14. An apparatus as recited in claim 8, wherein the pedestal has a same composition as the remainder of the first write pole, wherein the first and second high moment layers are directly coupled to each other, wherein the deposition thickness of the first high moment layer is less than a deposition thickness of the second high moment layer.

* * * * *